United States Patent
Ochiai

(10) Patent No.: US 9,710,835 B2
(45) Date of Patent: Jul. 18, 2017

(54) SERVER APPARATUS THAT PROVIDES E-COMMERCE SITE, PRODUCT INFORMATION DISPLAY PROGRAM, PRODUCT INFORMATION DISPLAY METHOD, E-COMMERCE SYSTEM, TERMINAL DEVICE, AND RECORDING MEDIUM ON WHICH PRODUCT INFORMATION DISPLAY PROGRAM IS RECORDED

(75) Inventor: Yukiko Ochiai, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 274 days.

(21) Appl. No.: 13/515,994

(22) PCT Filed: Jan. 27, 2011

(86) PCT No.: PCT/JP2011/051573
§ 371 (c)(1),
(2), (4) Date: Jun. 14, 2012

(87) PCT Pub. No.: WO2011/093366
PCT Pub. Date: Aug. 4, 2011

(65) Prior Publication Data
US 2012/0253911 A1   Oct. 4, 2012

(30) Foreign Application Priority Data

Jan. 29, 2010  (JP) .................................. 2010-019418

(51) Int. Cl.
G06Q 30/00 (2012.01)
G06Q 30/06 (2012.01)
G06Q 30/02 (2012.01)

(52) U.S. Cl.
CPC ..... G06Q 30/0603 (2013.01); G06Q 30/0222 (2013.01); G06Q 30/0643 (2013.01)

(58) Field of Classification Search
CPC .......... G06Q 30/0619; G06Q 30/0641; G06Q 30/0643; G06Q 30/0222
(Continued)

(56) References Cited

U.S. PATENT DOCUMENTS 7,225,148 B2 *  5/2007  Kassan ..................... 705/26.44
7,571,105 B2 *  8/2009  Hamzy et al. ................ 705/1.1
(Continued)

FOREIGN PATENT DOCUMENTS

JP   2002-236694 A   8/2002
JP   2002-259757 A   9/2002
(Continued)

OTHER PUBLICATIONS

Snell, Jason: "Review: Snow Leopard: Mac OS X 10.6 upgrade: price performance, feature tweaks," Macworld, Nov. 2009, v26i11pg32; ProQuest Dialog #210225341, 13pgs.*
(Continued)

Primary Examiner — Rob Pond
(74) Attorney, Agent, or Firm — Sughre Mion, PLLC

(57) ABSTRACT

The present invention provides, for example, a terminal device which allows users to easily check whether or not predetermined conditions such as free shipping conditions are met in, for example, a net supermarket site, and prevents display of a shopping cart from preventing product information from being enlarged and displayed or a great number of pieces of product information from being displayed. Display control is performed such that, while a shopping cart is displayed in the first display area until predetermined conditions are met, the shopping cart is displayed in the second display area below the first display area after the predetermined conditions are met.

29 Claims, 10 Drawing Sheets

(58) Field of Classification Search
USPC .......................... 705/26.44, 27.1, 26, 27, 14
See application file for complete search history.

(56) References Cited

U.S. PATENT DOCUMENTS

| | | | | |
|---|---|---|---|---|
| 7,707,505 | B1* | 4/2010 | Ohrt | ................. G06F 17/30893 |
| | | | | 715/738 |
| 7,912,755 | B2* | 3/2011 | Perry et al. | ................. 705/26.61 |
| 8,412,567 | B2* | 4/2013 | Evevsky | ................. G06Q 30/02 |
| | | | | 705/14.1 |
| 2002/0161662 | A1* | 10/2002 | Bredow | ................. G06Q 30/06 |
| | | | | 705/26.3 |
| 2004/0153371 | A1* | 8/2004 | Razumov | ........... G06Q 30/0643 |
| | | | | 705/27.2 |
| 2006/0095354 | A1* | 5/2006 | Hamzy et al. | ................. 705/35 |
| 2007/0061412 | A1* | 3/2007 | Karidi et al. | ................. 709/217 |
| 2007/0260997 | A1 | 11/2007 | Braun et al. | |
| 2008/0300925 | A1* | 12/2008 | Benson | ................. G06Q 10/02 |
| | | | | 705/5 |
| 2009/0075694 | A1* | 3/2009 | Kim et al. | ................. 455/556.1 |
| 2009/0099935 | A1* | 4/2009 | Hamzy et al. | ................. 705/14 |
| 2009/0234722 | A1* | 9/2009 | Evevsky | ................. 705/14 |
| 2009/0265732 | A1* | 10/2009 | Ide et al. | ................. 725/32 |
| 2010/0070529 | A1* | 3/2010 | Gokturk et al. | ................. 707/780 |
| 2010/0079490 | A1* | 4/2010 | Terazono et al. | ................. 345/629 |
| 2011/0173102 | A1* | 7/2011 | Burns et al. | ................. 705/27.2 |

FOREIGN PATENT DOCUMENTS

| | | | |
|---|---|---|---|
| JP | 2005-25300 A | | 1/2005 |
| JP | 2007115184 A | | 5/2007 |
| JP | 2008145541 A | * | 6/2008 |
| JP | 2009-134684 A | | 6/2009 |
| JP | 2009-535738 A | | 10/2009 |
| KR | 2002-0084148 A | | 11/2002 |
| KR | 20080036290 A | | 4/2008 |

OTHER PUBLICATIONS

Microsoft Computer Dicitionary Fifth Edition, 2002.*
International Search Report for PCT/JP2011/051573 dated Feb. 22, 2011.

* cited by examiner

SERVER APPARATUS THAT PROVIDES E-COMMERCE SITE, PRODUCT INFORMATION DISPLAY PROGRAM, PRODUCT INFORMATION DISPLAY METHOD, E-COMMERCE SYSTEM, TERMINAL DEVICE, AND RECORDING MEDIUM ON WHICH PRODUCT INFORMATION DISPLAY PROGRAM IS RECORDED

CROSS REFERENCE TO RELATED APPLICATIONS

This application is a National Stage of International Application No. PCT/JP2011/051573 filed Jan. 27, 2011 claiming priority based on Japanese Patent Application No. 2010-019418 filed Jan. 29, 2010, the contents of all of which are incorporated herein by reference in their entirety.

TECHNICAL FIELD

The present invention relates to a technical field of e-commerce utilizing a network such as Internet.

BACKGROUND ART

In recent years, sites (hereinafter "shopping mall sites") are known which provide shopping malls in which a lot of stores are opened on Internet. A user of a shopping mall selects a desired product from products participants listed in the shopping mall through a Web page transmitted to a user terminal from the shopping mall site, undergoes an order procedure and purchases the selected product (see, for example, Patent Literature 1).

CITATION LIST

Patent Literature

PTL 1: Japanese Patent Application Laid-Open No.

SUMMARY OF THE INVENTION

Problem to be Solved by the Invention

In the shopping mall site, when a product is selected in a product selection screen, the selected product is registered in a so-called shopping cart. Display of products registered in the shopping cart (that is, content of the shopping cart) is usually fixed. Hence, with a shopping mall site which does not display a shopping cart, while some operations are frequently required at all times to check the shopping cart, with a shopping mall site which displays a shopping cart in a fixed fashion, the shopping cart is displayed at all times even when the shopping cart does not need to be checked.

The present invention is made in light of the foregoing, and an example of this object is to provide, for example, a server apparatus which provides an e-commerce site which, in case where predetermined trade terms and conditions regarding user's purchase of the product are not met, allows a user to easily learn information related to a product selected by the user (for example, content of a shopping cart), and which, in case where trade terms and conditions are met, prevents information regarding the product selected by the user from preventing product information from being enlarged and displayed or a great number of pieces of product information from being displayed.

Means for Solving the Problem

In order to solve the above problem, according to an exemplary aspect of the invention, there is provided a server apparatus that provides an e-commerce site related to a trade of a product, to a terminal device connected through a network, the server apparatus comprising: a display data generating means that generates display data for making a display unit of the terminal device display a trade screen that displays product information related to the product for a plurality of products; a transmitting means that transmits the display data generated by the display data generating means, to the terminal device; and a selected product identification information receiving means that receives, from the terminal device, selected product identification information for identifying a product selected to trade among products corresponding to product information displayed on the trade screen, wherein: the display data generating means identifies a product selected according to a selection operation based on selected product identification information received by the selected product identification information receiving means, acquires selected product related information related to a trade among product information related to the identified product, generates the display data for making a first display area in the trade screen display the selected product related information when trade conditions of the selected product do not meet predetermined trade terms and conditions at a given point of time and generates the display data for making a second display area in the trade screen different from the first display area display the selected product related information when the trade terms and conditions are met; and the second display area is positioned below the first display area in the trade screen.

According to an exemplary aspect, selected product related information is displayed in the first display area in the display unit when predetermined trade terms and conditions related to product selection are not met, and the display area (second display area) of the selected product related information is moved downward when the trade terms and conditions are met.

Consequently, the user can check the selected product related information in the first display area until the trade terms and conditions are met, and recognize that the trade terms and conditions are met, based on that the selected product related information is moved from the first display area to the second display area. Further, when the trade terms and conditions are met, display of the selected product related information is moved downward so as not to prevent product information from being enlarged and displayed or a great number of pieces of product information from being displayed in an upper portion of the screen which is highly visible for the user, so that it is possible to improve user's visibility and effectively utilize a display area.

According to another exemplary aspect of the invention there is provided a server apparatus that provides an e-commerce site related to a trade of a product, to a terminal device connected through a network, the server apparatus comprising: a display data generating means that generates display data for making a display unit of the terminal device display a trade screen that displays product information related to the product for a plurality of products; a transmitting means that transmits the display data generated by the display data generating means, to the terminal device; and a selected product identification information receiving means that receives, from the terminal device, selected product identification information for identifying a product selected to trade among products corresponding to product information displayed on the trade screen, wherein the display data generating means identifies a product selected according to a selection operation based on selected product identification information received by the selected product identification information receiving means, acquires selected product related information related to a trade among product information related to the identified product, generates the display data for making the trade screen display the selected product related information when trade conditions of the selected product do not meet predetermined trade terms and conditions at a given point of time and generates the display data for not making the trade screen display the selected product related information when the trade terms and conditions are met.

According to an exemplary aspect, selected product related information is displayed on a trade screen when predetermined trade terms and conditions related to product selection are not met, and the selected product related information is no longer displayed when the trade terms and conditions are met.

Consequently, the user can check the selected product related information in the trade screen until the trade terms and conditions are met, and recognize that the trade terms and conditions are met, based on that the selected product related information is no longer displayed. Further, when the trade terms and conditions are met, the selected product related information is displayed so as not to prevent product information from being enlarged and displayed or a great number of pieces of product information from being displayed. Consequently, it is possible to improve the user's visibility and effectively utilize the display area.

According to an exemplary aspect of the server apparatus, the first display area is positioned above product information to be displayed in the trade screen. In this case, the first display area is positioned above product information, so that, when the trade terms and conditions are not met, the visibility of selected product related information improves.

According to an exemplary aspect of the server apparatus, the first display area comprises a portion that overlaps product information to be displayed in the trade screen, in up and down directions in the screen. In this case, the first display area and product information overlap in up and down directions, so that, when the trade terms and conditions are not met, the visibility for simultaneously checking the selected product related information and product information improves.

According to an exemplary aspect of the server apparatus, the second display area is positioned below product information to be displayed in the trade screen. In this case, when the trade terms and conditions are met, the second display area is positioned below product information, so that the selected product related information does not prevent product information from being enlarged and displayed or a great number of pieces of produce information from being displayed.

According to an exemplary aspect of the server apparatus, the trade terms and conditions are met when a total amount of prices of products selected according to the selection operation reaches a free shipping money amount determined in advance as an amount of money for providing free shipping of products.

According to an exemplary aspect, the user can select a product while checking the selected product related information until a total amount of prices of products selected by the user reaches a free shipping money amount. Further, the user can recognize that the total amount reaches the free shipping money amount, based on that a display mode of the selected product related information changed.

According to an exemplary aspect of the server apparatus, the display data generating means makes the trade screen display a difference between a total amount of prices of products selected according to the selection operation and the free shipping money amount when the trade terms and conditions are not met, and generates the display data for not making the trade screen display the difference when the trade terms and conditions are met.

According to an exemplary aspect, the rest of the amount of money to reach the free shipping money amount is displayed until the total amount of prices of products selected by the user reaches the free shipping money amount, so that the user can easily learn how much products the user needs to select to reach the free shipping money amount.

According to an exemplary aspect of the server apparatus, the trade terms and conditions are met when a number of products selected according to the selection operation reaches a free shipping number determined in advance as a number that provides free shipping of products.

According to an exemplary aspect, the user can select a product while checking the selected product related information until the number of products selected by the user reaches a free shipping number. Further, the user can recognize that the number of products reaches the free shipping number, based on that the display mode of the selected product related information changed.

According to an exemplary aspect of the server apparatus, the display data generating means enables the selected product related information to be displayed by detecting a display operation for displaying the selected product related information when the trade terms and conditions are met, and generates the display data for not making the trade screen display the selected product related information. In this case, the user can check the selected product related information anytime by performing a display operation.

According to an exemplary aspect of the server apparatus, the selected product related information indicates at least one of a name and a price of a product selected according to the selection operation and a total amount of prices of products selected according to the selection operation.

According to an exemplary aspect, the user check at least one of pieces of information indicating a name and price of the product selected by the user and the total amount of prices of the selected products.

According to an exemplary aspect of the server apparatus, the e-commerce site is a net supermarket site.

In a net supermarket site which covers several tens of thousands of products, and in which the products covered are relatively cheap, the user frequently needs to purchase a plurality of products to reach, for example, a purchase amount for free shipping. Hence, the selected product related information is preferably placed at a position to be easily checked until the total amount reaches the purchase amount for free shipping. However, after the purchase amount reaches the free shipping money amount once, it is less necessary to check the selected product related information, and it is desired to enlarge a product display screen of a net supermarket which covers a great number of products. Hence, when the trade terms and conditions are met in this way, moving the selected product related information downward or hiding the selected product related information is preferable for the net supermarket site.

According to another exemplary aspect of the invention, there is provided a server apparatus that provides an e-commerce site related to a trade of a product, to a terminal device connected through a network, wherein: the server apparatus transmits command data to the terminal device to cause the terminal device to function as: a display control means that makes a display unit display a trade screen that displays product information received from the server apparatus and related to the product for a plurality of products; and a selection operation detecting means that detects a selection operation of selecting a product corresponding to product information to be displayed in the trade screen, as a product to trade; the display control means makes a first display area in the trade screen display selected product related information related to a product selected according to the selection operation as a product to trade when trade conditions of the selected product do not meet predetermined trade terms and conditions at a given point of time, and makes a second display area in the trade screen different from the first display area display the selected product related information when the trade terms and conditions are met; and the second display area is positioned below the first display area in the trade screen.

According to an exemplary aspect, selected product related information is displayed in the first display area in the display unit when predetermined trade terms and conditions related to product selection are not met, and the display area (second display area) of the selected product related information is moved downward when the trade terms and conditions are met.

Consequently, the user can check the selected product related information in the first display area until the trade terms and conditions are met, and recognize that the trade terms and conditions are met, based on that the selected product related information is moved from the first display area to the second display area. Further, when the trade terms and conditions are met, display of the selected product related information is moved downward so as not to prevent product information from being enlarged and displayed or a great number of pieces of product information from being displayed in an upper portion of the screen which is highly visible for the user, so that it is possible to improve user's visibility and effectively utilize a display area.

According to another exemplary aspect of the invention, there is provided a server apparatus that provides an e-commerce site related to a trade of a product, to a terminal device connected through a network, the server apparatus comprising:

the server apparatus transmits command data to the terminal device to cause the terminal device to function as:

a display control means that makes a display unit display a trade screen that displays product information received from the server apparatus and related to the product for a plurality of products; and a selection operation detecting means that detects a selection operation of selecting a product corresponding to product information to be displayed in the trade screen, as a product to trade; and the display control means makes the trade screen display selected product related information related to a product selected according to the selection operation as a product to trade when trade conditions of the selected product do not meet predetermined trade terms and conditions at a given point of time, and does not make the trade screen display the selected product related information when the trade terms and conditions are met.

According to an exemplary aspect, selected product related information is displayed on a trade screen when predetermined trade terms and conditions related to product selection are not met, and the selected product related information is no longer displayed when the trade terms and conditions are met.

Consequently, the user can check the selected product related information in the trade screen until the trade terms and conditions are met, and recognize that the trade terms and conditions are met, based on that the selected product related information is no longer displayed. Further, when the trade terms and conditions are met, the selected product related information is displayed so as not to prevent product information from being enlarged and displayed or a great number of pieces of product information from being displayed. Consequently, it is possible to improve the user's visibility and effectively utilize the display area.

According to an exemplary aspect of the server apparatus, the first display area is positioned above product information to be displayed in the trade screen. In this case, the first display area is positioned above product information, so that, when the trade terms and conditions are not met, the visibility of selected product related information improves.

According to an exemplary aspect of the server apparatus, the first display area comprises a portion that overlaps product information to be displayed in the trade screen, in up and down directions in the screen. In this case, the first display area and product information overlap in up and down directions, so that, when the trade terms and conditions are not met, the visibility for simultaneously checking the selected product related information and product information improves.

According to an exemplary aspect of the server apparatus, the second display area is positioned below product information to be displayed in the trade screen. In this case, when the trade terms and conditions are met, the second display area is positioned below product information, so that the selected product related information does not prevent product information from being enlarged and displayed or a great number of pieces of produce information from being displayed.

According to an exemplary aspect of the server apparatus, the trade terms and conditions are met when a total amount of prices of products selected according to the selection operation reaches a free shipping money amount determined in advance as an amount of money for providing free shipping of products.

According to an exemplary aspect, the user can select a product while checking the selected product related information until a total amount of prices of products selected by the user reaches a free shipping money amount. Further, the user can recognize that the total amount reaches the free shipping money amount, based on that a display mode of the selected product related information changed.

According to an exemplary aspect of the server apparatus, the display control means makes the trade screen display a difference between a total amount of prices of products selected according to the selection operation and the free shipping money amount when the trade terms and conditions are not met, and does not make the trade screen display the difference when the trade terms and conditions are met.

According to an exemplary aspect, the rest of the amount of money to reach the free shipping money amount is displayed until the total amount of prices of products selected by the user reaches the free shipping money amount, so that the user can easily learn how much products the user needs to select to reach the free shipping money amount.

According to an exemplary aspect of the server apparatus, the trade terms and conditions are met when a number of products selected according to the selection operation reaches a free shipping number determined in advance as a number that provides free shipping of products.

According to an exemplary aspect, the user can select a product while checking the selected product related information until the number of products selected by the user reaches a free shipping number. Further, the user can recognize that the number of products reaches the free shipping number, based on that the display mode of the selected product related information changed.

According to an exemplary aspect of the server apparatus, the display control means enables the selected product related information to be displayed by detecting a display operation for displaying the selected product related information when the trade terms and conditions are met, and does not make the trade screen display the selected product related information. In this case, the user can check the selected product related information anytime by performing a display operation.

According an exemplary aspect of the server apparatus, the selected product related information indicates at least one of a name and a price of a product selected according to the selection operation and a total amount of prices of products selected according to the selection operation.

According to an exemplary aspect, the user check at least one of pieces of information indicating a name and price of the product selected by the user and the total amount of prices of the selected products.

According to an exemplary aspect of the server apparatus, the e-commerce site is a net supermarket site.

In a net supermarket site which covers several tens of thousands of products, and in which the products covered are relatively cheap, the user frequently needs to purchase a plurality of products to reach, for example, a purchase amount for free shipping. Hence, the selected product related information is preferably placed at a position to be easily checked until the total amount reaches the purchase amount for free shipping. However, after the purchase amount reaches the free shipping money amount once, it is less necessary to check the selected product related information, and it is desired to enlarge a product display screen of a net supermarket which covers a great number of products. Hence, when the trade terms and conditions are met in this way, moving the selected product related information downward or hiding the selected product related information is preferable for the net supermarket site.

According to another exemplary aspect of the invention, there is provided a product information display program causing a computer to function as: a receiving means that is connected to a server apparatus that provides an e-commerce site related to a trade of a product, through a network, and that receives product information related to the product for a plurality of products; a display control means that makes a display unit display a trade screen that displays the received product information of the plurality of products; and a selection operation detecting means that detects a selection operation of selecting a product corresponding to product information to be displayed in the trade screen, as a product to trade, wherein: when the computer is caused to function as the display control means, the display control means makes one area of a first display area in the trade screen display selected product related information related to a product selected according to the selection operation as a product to trade when trade conditions of the selected product do not meet predetermined trade terms and conditions at a given point of time, and makes a second display area in the trade screen different from the first display area display the selected product related information when the trade terms and conditions are met; and the second display area is positioned below the first display area in the trade screen.

According to an exemplary aspect, selected product related information is displayed in the first display area in the display unit when predetermined trade terms and conditions related to product selection are not met, and the display area (second display area) of the selected product related information is moved downward when the trade terms and conditions are met.

Consequently, the user can check the selected product related information in the first display area until the trade terms and conditions are met, and recognize that the trade terms and conditions are met, based on that the selected product related information is moved from the first display area to the second display area. Further, when the trade terms and conditions are met, display of the selected product related information is moved downward so as not to prevent product information from being enlarged and displayed or a great number of pieces of product information from being displayed in an upper portion of the screen which is highly visible for the user, so that it is possible to improve user's visibility and effectively utilize a display area.

According to another exemplary aspect of the invention, there is provided a product information display program causing a computer to function as: a receiving means that is connected to a server apparatus that provides an e-commerce site related to a trade of a product, through a network, and that receives product information related to the product for a plurality of products; a display control means that makes a display unit display a trade screen that displays the received product information of the plurality of products; and a selection operation detecting means that detects a selection operation of selecting a product corresponding to product information to be displayed in the trade screen, as a product to trade, wherein, when the computer is caused to function as the display control means, the display control means makes the trade screen display selected product related information related to a product selected according to the selection operation as a product to trade when trade conditions of the selected product do not meet predetermined trade terms and conditions at a given point of time, and does not make the trade screen display the selected product related information when the trade terms and conditions are met.

According an exemplary aspect, selected product related information is displayed on a trade screen when predetermined trade terms and conditions related to product selection are not met, and the selected product related information is no longer displayed when the trade terms and conditions are met.

Consequently, the user can check the selected product related information in the trade screen until the trade terms and conditions are met, and recognize that the trade terms and conditions are met, based on that the selected product related information is no longer displayed. Further, when the trade terms and conditions are met, the selected product related information is displayed so as not to prevent product information from being enlarged and displayed or a great number of pieces of product information from being displayed. Consequently, it is possible to improve the user's visibility and effectively utilize the display area.

According to another exemplary aspect of the invention, there is provided a product information display method comprising: a step of, at a computer, connecting to a server apparatus that provides an e-commerce site related to a trade of a product, through a network, and receiving product information related to the product for a plurality of products; a step of, at the computer, making a display unit display a trade screen that displays the received product information of a plurality of products; a step of, at the computer, detecting a selection operation of selecting a product corresponding to product information to be displayed in the trade screen, as a product to trade; and a step of, at the computer, making one area of a first display area in the trade screen display selected product related information related to a product selected according to the selection operation as a product to trade when trade conditions of the selected product do not meet predetermined trade terms and conditions at a given point of time, and making a second display area in the trade screen that is different from the first display area and that is positioned below the first display area display the selected product related information when the trade terms and conditions are met.

According to an exemplary aspect, selected product related information is displayed in the first display area in the display unit when predetermined trade terms and conditions related to product selection are not met, and the display area (second display area) of the selected product related information is moved downward when the trade terms and conditions are met.

Consequently, the user can check the selected product related information in the first display area until the trade terms and conditions are met, and recognize that the trade terms and conditions are met, based on that the selected product related information is moved from the first display area to the second display area. Further, when the trade terms and conditions are met, display of the selected product related information is moved downward so as not to prevent product information from being enlarged and displayed or a great number of pieces of product information from being displayed in an upper portion of the screen which is highly visible for the user, so that it is possible to improve user's visibility and effectively utilize a display area.

According to another exemplary aspect of the invention there is provided a product information display method comprising: a step of, at a computer, connecting to a server apparatus that provides an e-commerce site related to a trade of a product, through a network, and receiving product information related to the product for a plurality of products; a step of, at the computer, making a display unit display a trade screen that displays the received product information of a plurality of products; a step of, at the computer, detecting a selection operation of selecting a product corresponding to product information to be displayed in the trade screen, as a product to trade; and a step of, at the computer, making the trade screen display selected product related information related to a product selected according to the selection operation as a product to trade when trade conditions of the selected product do not meet predetermined trade terms and conditions at a given point of time, and not making the trade screen display the selected product related information when the trade terms and conditions are met.

According to an exemplary aspect, selected product related information is displayed on a trade screen when predetermined trade terms and conditions related to product selection are not met, and the selected product related information is no longer displayed when the trade terms and conditions are met.

Consequently, the user can check the selected product related information in the trade screen until the trade terms and conditions are met, and recognize that the trade terms and conditions are met, based on that the selected product related information is no longer displayed. Further, when the trade terms and conditions are met, the selected product related information is displayed so as not to prevent product information from being enlarged and displayed or a great number of pieces of product information from being displayed. Consequently, it is possible to improve the user's visibility and effectively utilize the display area.

According to another exemplary aspect of the invention, there is provided an e-commerce system comprising: a server apparatus that provides an e-commerce site related to a trade of a product, and a terminal device that is connected with the server apparatus through a network, wherein: the server apparatus comprises: a display data generating means that generates display data for making a display unit of the terminal device display a trade screen that displays product information related to the product for a plurality of products; a transmitting means that transmits the display data generated by the display data generating means, to the terminal device; and a selected product identification information receiving means that receives, from the terminal device, selected product identification information for identifying a product selected to trade among products corresponding to product information displayed on the trade screen; the terminal device comprises: a display data receiving means that receives display data transmitted from the transmitting means; and a display control means that makes a display unit display the trade screen, based on the received display data; the display data generating means of the server apparatus identifies a product selected according to a selection operation based on selected product identification information received by the selected product identification information receiving means, acquires selected product related information related to a trade among product information related to the identified product, generates the display data for making a first display area in the trade screen display the selected product related information when trade conditions of the selected product do not meet predetermined trade terms and conditions at a given point of time and generates the display data for making a second display area in the trade screen different from the first display area display the selected product related information when the trade terms and conditions are met; and the second display area is positioned below the first display area in the trade screen.

According to an exemplary aspect, selected product related information is displayed in the first display area in the display unit when predetermined trade terms and conditions related to product selection are not met, and the display area (second display area) of the selected product related information is moved downward when the trade terms and conditions are met.

Consequently, the user can check the selected product related information in the first display area until the trade terms and conditions are met, and recognize that the trade terms and conditions are met, based on that the selected product related information is moved from the first display area to the second display area. Further, when the trade terms and conditions are met, display of the selected product related information is moved downward so as not to prevent product information from being enlarged and displayed or a great number of pieces of product information from being displayed in an upper portion of the screen which is highly visible for the user, so that it is possible to improve user's visibility and effectively utilize a display area.

According to another exemplary aspect of the invention, there is provided an e-commerce system comprising: a server apparatus that provides an e-commerce site related to a trade of a product, and a terminal device that is connected with the server apparatus through a network, wherein: the server apparatus comprises: a display data generating means that generates display data for making a display unit of the terminal device display a trade screen that displays product information related to the product for a plurality of products; a transmitting means that transmits the display data generated by the display data generating means, to the terminal device; and a selected product identification information receiving means that receives, from the terminal device, selected product identification information for identifying a product selected to trade among products corresponding to product information displayed on the trade screen; the terminal device comprises: a display data receiving means that receives display data transmitted from the transmitting means; and a display control means that makes a display unit display the trade screen, based on the received display data; and the display data generating means of the server apparatus identifies a product selected according to a selection operation based on selected product identification information received by the selected product identification information receiving means, acquires selected product related information related to a trade among product information related to the identified product, generates the display data for making the trade screen display the selected product related information when trade conditions of the selected product do not meet predetermined trade terms and conditions at a given point of time and generates the display data for not making the trade screen display the selected product related information when the trade terms and conditions are met.

According to an exemplary aspect, selected product related information is displayed on a trade screen when predetermined trade terms and conditions related to product selection are not met, and the selected product related information is no longer displayed when the trade terms and conditions are met.

Consequently, the user can check the selected product related information in the trade screen until the trade terms and conditions are met, and recognize that the trade terms and conditions are met, based on that the selected product related information is no longer displayed. Further, when the trade terms and conditions are met, the selected product related information is displayed so as not to prevent product information from being enlarged and displayed or a great number of pieces of product information from being displayed. Consequently, it is possible to improve the user's visibility and effectively utilize the display area.

According to another exemplary aspect of the invention, there is provided an e-commerce system comprising: a server apparatus that provides an e-commerce site related to a trade of a product, and a terminal device that is connected with the server apparatus through a network, wherein: the server apparatus transmits command data to the terminal device to cause the terminal device to function as: a display control means that makes a display unit display a trade screen that displays product information received from the server apparatus and related to the product for a plurality of products; and a selection operation detecting means that detects a selection operation of selecting a product corresponding to product information to be displayed in the trade screen, as a product to trade;

the terminal device functions as the display control means and the selection operation detecting means, based on command data received from the server apparatus; the display control means makes a first display area in the trade screen display selected product related information related to a product selected according to the selection operation as a product to trade when trade conditions of the selected product do not meet predetermined trade terms and conditions at a given point of time, and makes a second display area in the trade screen different from the first display area display the selected product related information when the trade terms and conditions are met; and the second display area is positioned below the first display area in the trade screen.

According to an exemplary aspect, selected product related information is displayed in the first display area in the display unit when predetermined trade terms and conditions related to product selection are not met, and the display area (second display area) of the selected product related information is moved downward when the trade terms and conditions are met.

Consequently, the user can check the selected product related information in the first display area until the trade terms and conditions are met, and recognize that the trade terms and conditions are met, based on that the selected product related information is moved from the first display area to the second display area. Further, when the trade terms and conditions are met, display of the selected product related information is moved downward so as not to prevent product information from being enlarged and displayed or a great number of pieces of product information from being displayed in an upper portion of the screen which is highly visible for the user, so that it is possible to improve user's visibility and effectively utilize a display area.

According to another exemplary aspect of the invention, there is provided an e-commerce system comprising: a server apparatus that provides an e-commerce site related to a trade of a product, and a terminal device that is connected with the server apparatus through a network, wherein: the server apparatus transmits command data to the terminal device to cause the terminal device to function as: a display control means that makes a display unit display a trade screen that displays product information received from the server apparatus and related to the product for a plurality of products; and a selection operation detecting means that detects a selection operation of selecting a product corresponding to product information to be displayed in the trade screen, as a product to trade;

the terminal device functions as the display control means and the selection operation detecting means, based on command data received from the server apparatus; and the display control means makes the trade screen display selected product related information related to a product selected according to the selection operation as a product to trade when trade conditions of the selected product do not meet predetermined trade terms and conditions at a given point of time, and does not make the trade screen display the selected product related information when the trade terms and conditions are met.

According to an exemplary aspect, selected product related information is displayed on a trade screen when predetermined trade terms and conditions related to product selection are not met, and the selected product related information is no longer displayed when the trade terms and conditions are met.

Consequently, the user can check the selected product related information in the trade screen until the trade terms and conditions are met, and recognize that the trade terms and conditions are met, based on that the selected product related information is no longer displayed. Further, when the trade terms and conditions are met, the selected product related information is displayed so as not to prevent product information from being enlarged and displayed or a great number of pieces of product information from being displayed. Consequently, it is possible to improve the user's visibility and effectively utilize the display area.

According to another exemplary aspect of the invention, there is provided a terminal device that is connected to a server apparatus that provides an e-commerce site related to a trade of a product, through a network, the terminal device comprising: a receiving means that receives product information related to the product for a plurality of products, from the server apparatus; a display control means that makes a display unit display a trade screen that displays the received product information of the plurality of products; and a selection operation detecting means that detects a selection operation of selecting a product corresponding to product information to be displayed in the trade screen, as a product to trade, wherein: the display control means makes a first display area in the trade screen display selected product related information related to a product selected according to the selection operation as a product to trade when trade conditions of the selected product do not meet predetermined trade terms and conditions at a given point of time, and makes a second display area in the trade screen different from the first display area display the selected product related information when the trade terms and conditions are met; and the second display area is positioned below the first display area in the trade screen.

According to an exemplary aspect, selected product related information is displayed in the first display area in the display unit when predetermined trade terms and conditions related to product selection are not met, and the display area (second display area) of the selected product related information is moved downward when the trade terms and conditions are met.

Consequently, the user can check the selected product related information in the first display area until the trade terms and conditions are met, and recognize that the trade terms and conditions are met, based on that the selected product related information is moved from the first display area to the second display area. Further, when the trade terms and conditions are met, display of the selected product related information is moved downward so as not to prevent product information from being enlarged and displayed or a great number of pieces of product information from being displayed in an upper portion of the screen which is highly visible for the user, so that it is possible to improve user's visibility and effectively utilize a display area.

According to another exemplary aspect of the invention, there is provided a terminal device that is connected to a server apparatus that provides an e-commerce site related to a trade of a product, through a network, the terminal device comprising: a receiving means that receives product information related to the product for a plurality of products, from the server apparatus; a display control means that makes a display unit display a trade screen that displays the received product information of the plurality of products; and a selection operation detecting means that detects a selection operation of selecting a product corresponding to product information to be displayed in the trade screen, as a product to trade, wherein the display control means makes the trade screen display selected product related information related to a product selected according to the selection operation as a product to trade when trade conditions of the selected product do not meet predetermined trade terms and conditions at a given point of time, and does not make the trade screen display the selected product related information when the trade terms and conditions are met.

According to an exemplary aspect, selected product related information is displayed on a trade screen when predetermined trade terms and conditions related to product selection are not met, and the selected product related information is no longer displayed when the trade terms and conditions are met.

Consequently, the user can check the selected product related information in the trade screen until the trade terms and conditions are met, and recognize that the trade terms and conditions are met, based on that the selected product related information is no longer displayed. Further, when the trade terms and conditions are met, the selected product related information is displayed so as not to prevent product information from being enlarged and displayed or a great number of pieces of product information from being displayed. Consequently, it is possible to improve the user's visibility and effectively utilize the display area.

According to another exemplary aspect of the invention, on there is provided a recording medium on which a product information display program is recorded, the product information display program causing a computer to function as: a receiving means that is connected to a server apparatus that provides an e-commerce site related to a trade of a product, through a network, and that receives product information related to the product for a plurality of products; a display control means that makes a display unit display a trade screen that displays the received product information of the plurality of products; and a selection operation detecting means that detects a selection operation of selecting a product corresponding to product information to be displayed in the trade screen, as a product to trade, wherein: when the computer is caused to function as the display control means, the display control means makes one area of a first display area in the trade screen display selected product related information related to a product selected according to the selection operation as a product to trade when trade conditions of the selected product do not meet predetermined trade terms and conditions at a given point of time, and makes a second display area in the trade screen different from the first display area display the selected product related information when the trade terms and conditions are met; and the second display area is positioned below the first display area in the trade screen.

According to another exemplary aspect of the invention, there is provided a recording medium on which a product information display program is recorded, the product information display program causing a computer to function as: a receiving means that is connected to a server apparatus that provides an e-commerce site related to a trade of a product, through a network, and that receives product information related to the product for a plurality of products; a display control means that makes a display unit display a trade screen that displays the received product information of the plurality of products; and a selection operation detecting means that detects a selection operation of selecting a product corresponding to product information to be displayed in the trade screen, as a product to trade, wherein, when the computer is caused to function as the display control means, the display control means makes the trade screen display selected product related information related to a product selected according to the selection operation as a product to trade when trade conditions of the selected product do not meet predetermined trade terms and conditions at a given point of time, and does not make the trade screen display the selected product related information when the trade terms and conditions are met.

Effect of the Invention

Consequently, according to the present invention, the user can easily check selected product related information on a trade screen until the trade terms and conditions are met, and recognize that the trade terms and conditions are met, based on that a display mode on the trade screen of the selected product related information changed. Further, when the trade terms and conditions are met, display of the selected product related information is prevented from preventing product information from being enlarged and displayed or a great number of pieces of product information from being displayed, so that it is possible to improve the user's visibility.

MODES FOR CARRYING OUT THE INVENTION

Hereinafter, an embodiment of the present invention will be described with reference to the accompanying drawings. In addition, an embodiment which will be described below is an embodiment where the present invention is applied to an order receiving system.

[1. Overview of Configuration and Function of Order Receiving System]

First, an overview of a configuration and function of an order receiving system S according to an embodiment of the present invention will be described using FIG. 1.

Figure 1:
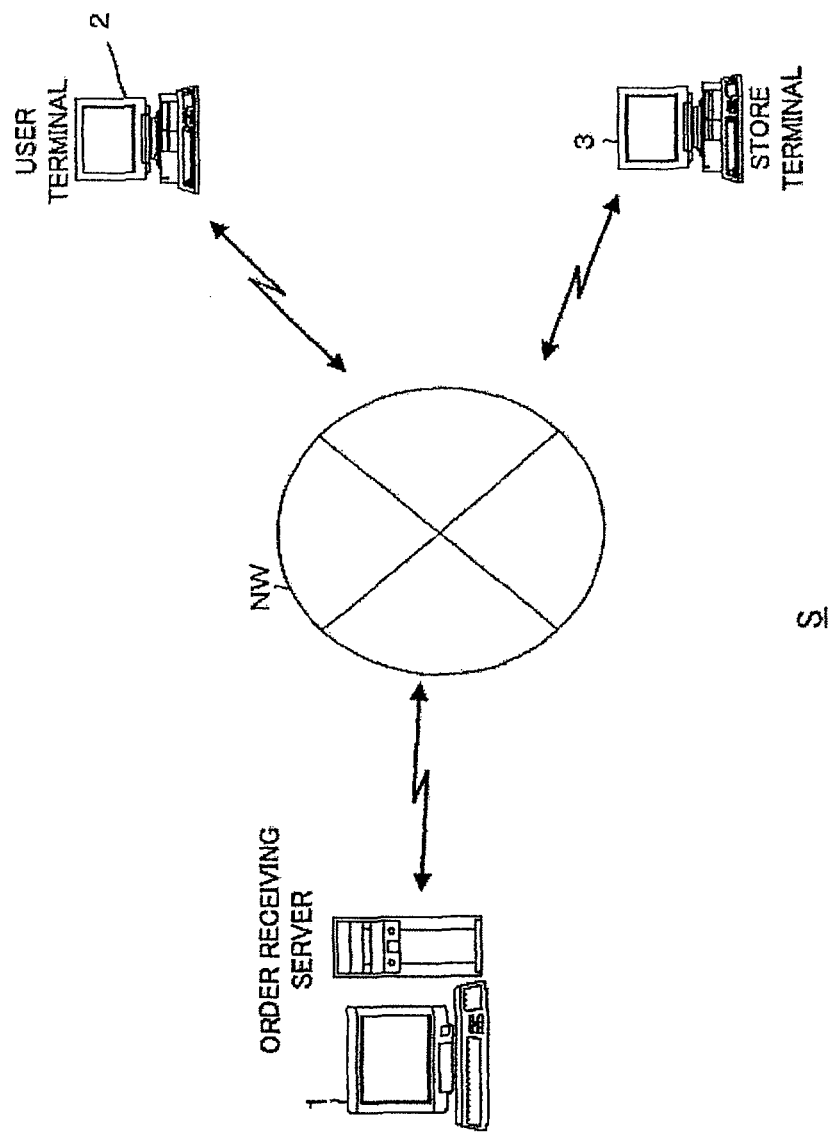
FIG. 1 is a view illustrating an example of a schematic configuration of an order receiving system according to the present embodiment.

As illustrated in FIG. 1, the order receiving system S is formed as a net supermarket site including an order receiving server 1 (an example of a "server apparatus"), a user terminal 2 (an example of a "terminal device") and a store terminal 3. In addition, with the example of FIG. 1, for ease description, although one user terminal 2 is illustrated, multiple user terminals can actually access the order receiving server 1. Similarly, the number of store terminals 3 also corresponds to the number of supermarkets which join the net supermarket site. Meanwhile, the net supermarket refers to a delivery service which receives an order of a product through a net supermarket site provided on Internet by an existing supermarket or a delivery dedicated vendor which does not have a store, and which delivers an ordered product to a customer's house.

The order receiving server 1, user terminal 2 and store terminal 3 can transmit and receive data to and from each other through a network NW by applying, for example, TCP/IP to a communication protocol. In addition, the network NW is constructed with, for example, Internet, a dedicated communication line (for example, CATV (Community Antenna Television) line), a mobile communication network (including, for example, a base station) and a gateway.

The order receiving server 1 is disposed to run a net supermarket site in which supermarkets join, and receives an order of a product from the user terminal 2 and delivers order content to the store terminal 3 disposed on the supermarket side. Particularly, the order receiving server 1 according to the present embodiment makes a display unit of the user terminal 2 display content of a so-called shipping cart (an example of "selected product related information") which displays information related to the products selected by the user, through a product list screen (an example of a "trade screen") displayed on the user terminal 2 until free shipping conditions (an example of "trade terms and conditions") are met, and, after the free shipping conditions are met, does not make the display unit of the user terminal 2 display content of the shipping cart as long as the operation of displaying the content of the shipping cart is performed. In addition, the free shipping conditions according to the present embodiment include that products equivalent to 2000 yen (an example of a "free shipping money amount") are registered in the shipping cart. Further, when checkout processing is performed in a state where the free shipping conditions are met, a benefit that shipping of products registered in the shopping cart becomes free is given to the user.

The user terminal 3 has a Web browser function, and transmits, for example, a HTTP (Hyper Text Transfer Protocol) request to the order receiving server 1 and acquires, for example, a Web page as a response to display on a display. Consequently, the user of the user terminal 3 can browse information provided by the net supermarket site. In addition, for example, a personal computer, PDA (Personal Digital Assistant), or mobile telephone is applicable to the user terminal 3.

[2. Configuration and Function of Order Receiving Server 1]

Next, the configuration and function of the order receiving server 1 will be described using FIGS. 2 and 3.

Figure 2:
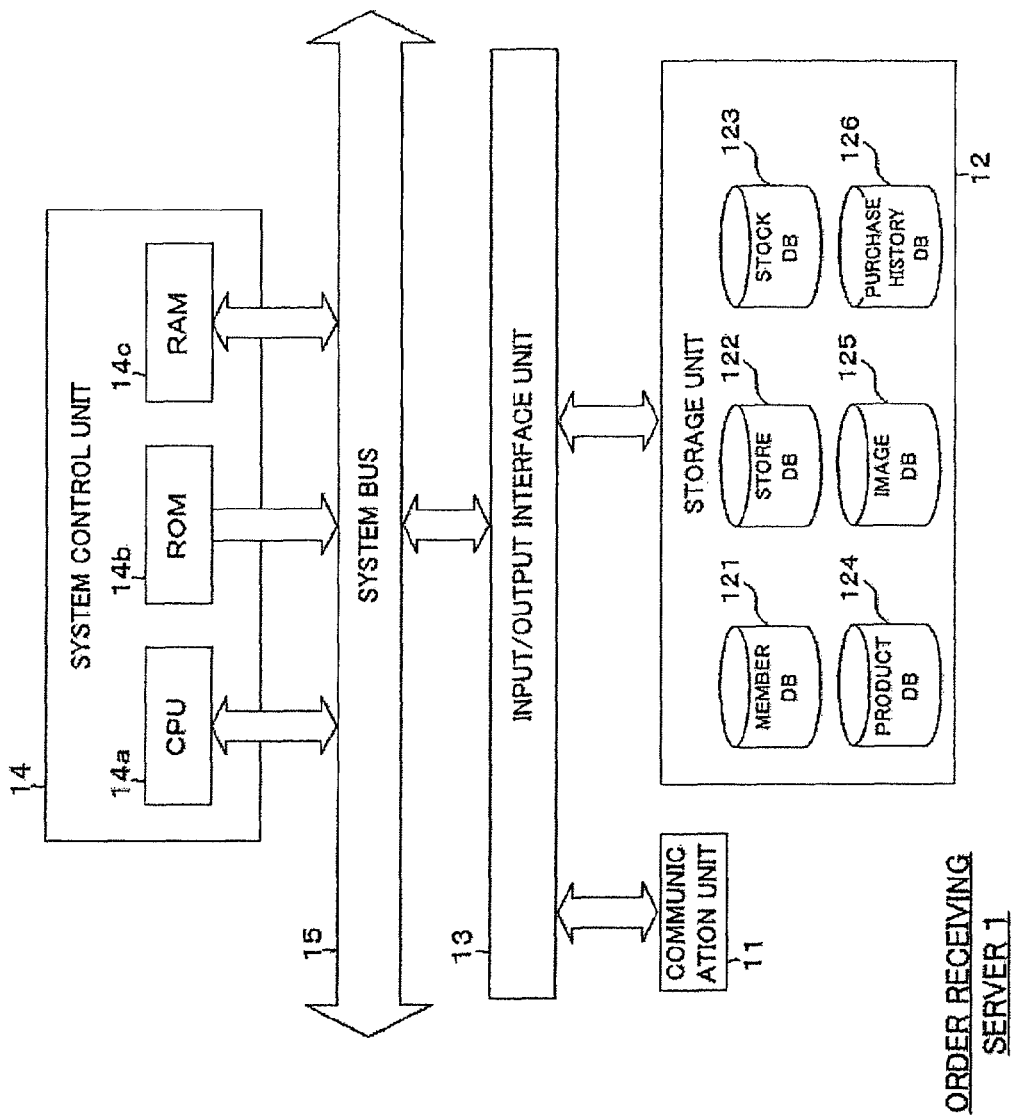
FIG. 2 is a block diagram illustrating an example of a schematic configuration of an order receiving server according to the present embodiment.
Figure 3:
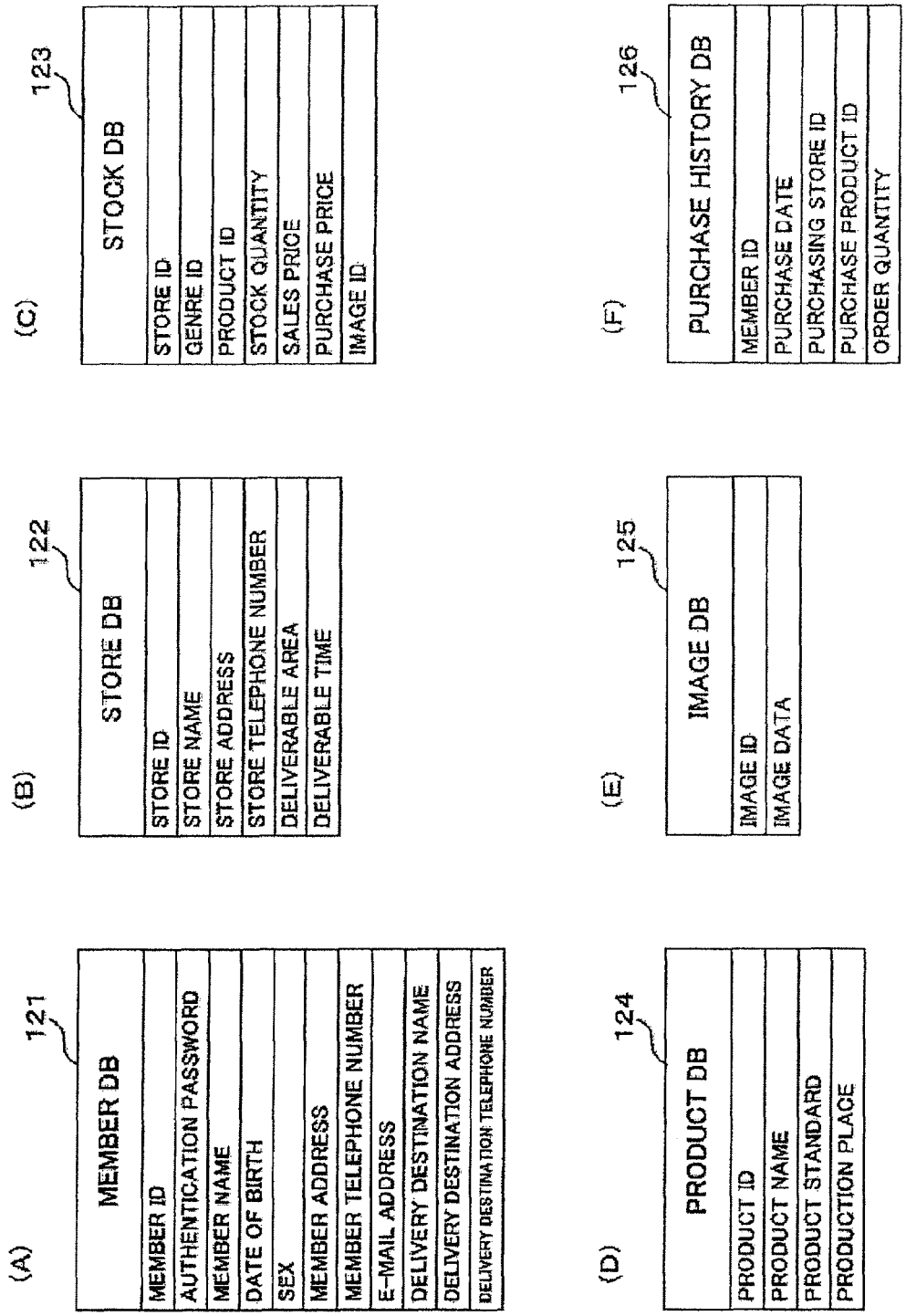
FIG. 3 is a view illustrating an example of content to be registered in various databases.

As illustrated in FIG. 2, the order receiving server 1 has a communication unit 11, a storage unit 12, an input/output interface unit 13 and a system control unit 14. Further, the system control unit 14 and input/output interface unit 13 are connected through a system bus 15.

The communication unit 11 is connected to the network NW to control a communication state with the user terminal 2 or store terminal 3.

The storage unit 12 is formed with, for example, a hard disk drive, and stores various softwares such as operating system and server softwares. In addition, the various softwares may be acquired through the network NW from, for example, other server apparatuses, or may be recorded in a recording medium and read through a drive apparatus.

Further, the storage unit 12 stores site information provided from the net supermarket site to the user terminal 2 or store terminal 3. Meanwhile, the site information includes Web pages of various screens, and data such as an image to be embedded on a Web page.

Further, in the storage unit 12, a member DB (Data Base) 121, a store DB 122, a stock DB 123, a product DB 124, an image DB 125 and a purchase history DB 126 are constructed. In addition, the storage unit 12 is an example of a "product information storage means" of the server apparatus.

In the member DB 121 illustrated in FIG. 3(A), attribute information (hereinafter, referred to as "member information") such as member IDs, authentication passwords, member names, dates of birth, sex, member addresses, member telephone numbers, e-mail addresses, delivery destination names and delivery destination addresses of registered members (who are users of the net supermarket and customers of products) is registered. The member information can be identified per member according to a member ID. Meanwhile, the member ID is an identifier for identifying a member. Further, the delivery destination means the destination of delivery of a product purchased on the net supermarket. Further, the member ID and authentication password are log-in information used for log-in processing (authentication processing of a member).

In the store DB 122 illustrated in FIG. 3(B), store information such as store IDs, store names, store addresses, store telephone numbers, deliverable areas and deliverable times of supermarkets (including branch stores) opened in the net supermarket is registered. The store information can be identified per supermarket or branch store opened in the net supermarket according to a store ID. Meanwhile, the store ID is an identifier for identifying an opened store or opened branch store.

In the stock DB 123 illustrated in FIG. 3(C), genre IDs, product IDs, stock quantities, sales prices, purchase prices and image IDs of products covered by a store identified according to a store ID are registered per store ID. Meanwhile, the genre ID is an identifier for identifying a genre to which a product belongs. The product ID is an identifier for identifying a type of a product, and the image ID is an identifier for identifying an image of a product. Information registered in the stock DB 123 is adequately updated based on information received from the store terminal 3 disposed at each store. Further, instead of providing the stock DB 123 in the order receiving server 1, it may be possible to provide the stock DB 123 in a storage unit in the store terminal 3 disposed at each store and allow the order receiving server 1 to access the stock DB 123 in the store terminal 3.

In the product DB 124 illustrated in FIG. 3(D), product names, product standards and production places of products are registered per product ID. That is, the product DB 124 functions as a product information storage means that associates at least one of images, names and prices of a plurality of products as product information, with a corresponding product to store. As product standards, data indicating a size of a product such as L (large), M (middle) and S (small), data indicating the capacity of a product and data indicating packaging units of products (for example, three items in one bag) are registered.

In the image DB 125 illustrated in FIG. 3(E), image data transmitted to the user terminal 2 is registered per image ID. In the image DB 125, image data can be registered by an operation staff of the net supermarket, or can be registered by a staff of the supermarket from the store terminal 3.

In the purchase history DB 126 illustrated in FIG. 3(F), history information related to products purchased by a member by utilizing a net supermarket site is registered. More specifically, member IDs, dates of purchase, purchasing store IDs, purchased product IDs, and order quantities are registered.

The input/output interface unit 13 performs interface processing between the communication unit 11 and storage unit 12, and the system control unit 14.

The system control unit 14 is formed with, for example, a CPU (Central Processing Unit) 14a, a ROM (Read Only Memory) 14b and a RAM (Random Access Memory) 14c. Further, the CPU 14a realizes various functions by reading and executing various programs stored in the ROM 14b and storage unit 12. In addition, the system control unit 14 is an example of a "transmitting means" and a "selected product identification information receiving means" of the server apparatus.

The system control unit 14 generates Web page data ("product list screen Web page data") for displaying a product list screen on the display unit of the user terminal 2, and transmits the Web page data to the user terminal 2.

[3. Configuration and Function of User Terminal 2]

Next, the configuration and function of the user terminal 2 will be described using FIGS. 4 to 6.

Figure 4:
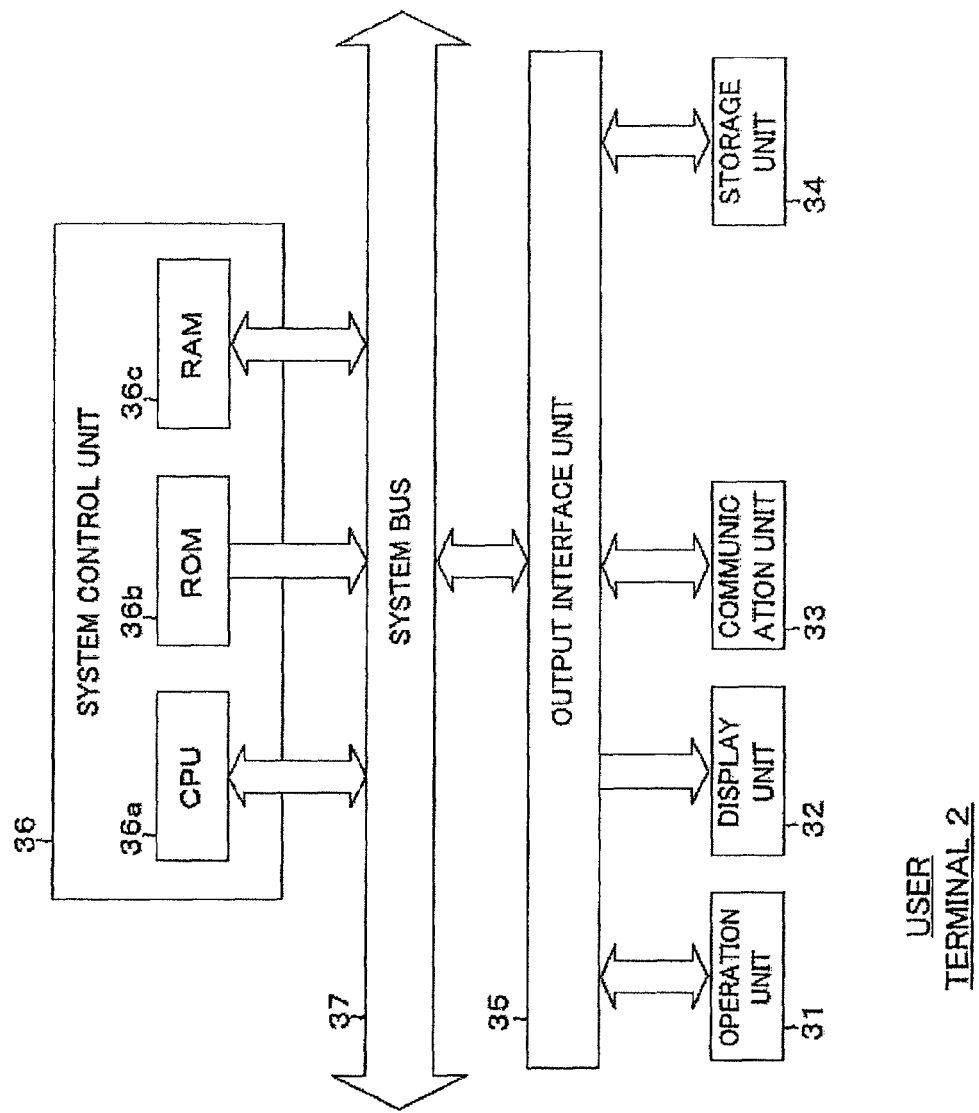
FIG. 4 is a block diagram illustrating an example of a schematic configuration of a user terminal according to the present embodiment.

As illustrated in FIG. 4, the user terminal 2 has an operation unit 31, a display unit 32, a communication unit 33, a storage unit 34, an input/output interface unit 35 and a system control unit 36. Further, the system control unit 36 and input/output interface unit 35 are connected through a system bus 37.

The operation unit 31 includes, for example, a keyboard and mouse, and receives an operation command from the user and outputs the command content to the system control unit 36 as a command signal. The display unit 32 is formed with, for example, a CRT (Cathode Ray Tube) display or liquid crystal display, and displays information such as texts and images.

The communication unit 33 is connected to the network NW to control the communication state with the order receiving server 1.

The storage unit 34 is formed with, for example, a hard disk drive, and stores various softwares such as operating system and browser softwares. In addition, these softwares may be acquired through the network NW from, for example, other server apparatuses, or may be recorded in a recording medium and read through a drive apparatus.

The input/output interface unit 35 performs interface processing between the operation unit 31, display unit 32, communication unit 33 and storage unit 34, and the system control unit 36.

The system control unit 36 is formed with, for example, a CPU (Central Processing Unit) 36a, a ROM (Read Only Memory) 36b and a RAM (Random Access Memory) 36c. Further, the CPU 36a realizes various functions by reading and executing various programs stored in the ROM 36b and storage unit 34. In addition, the system control unit 36 is an example of a "receiving means", a "display control means", a "selection operation detecting means" and a "display data receiving means" of the terminal device.

Further, when receiving product list screen Web page data from the order receiving server 1, the system control unit 36 makes the display unit 32 display a product list screen. Hereinafter, a product list screen 200 will be described using FIGS. 5 and 6. In addition, FIG. 5 illustrates the product list screen 200 in a state before the free shipping conditions are met, and FIG. 6 illustrates the product list screen 200 after the free shipping conditions are met.

Figure 5:
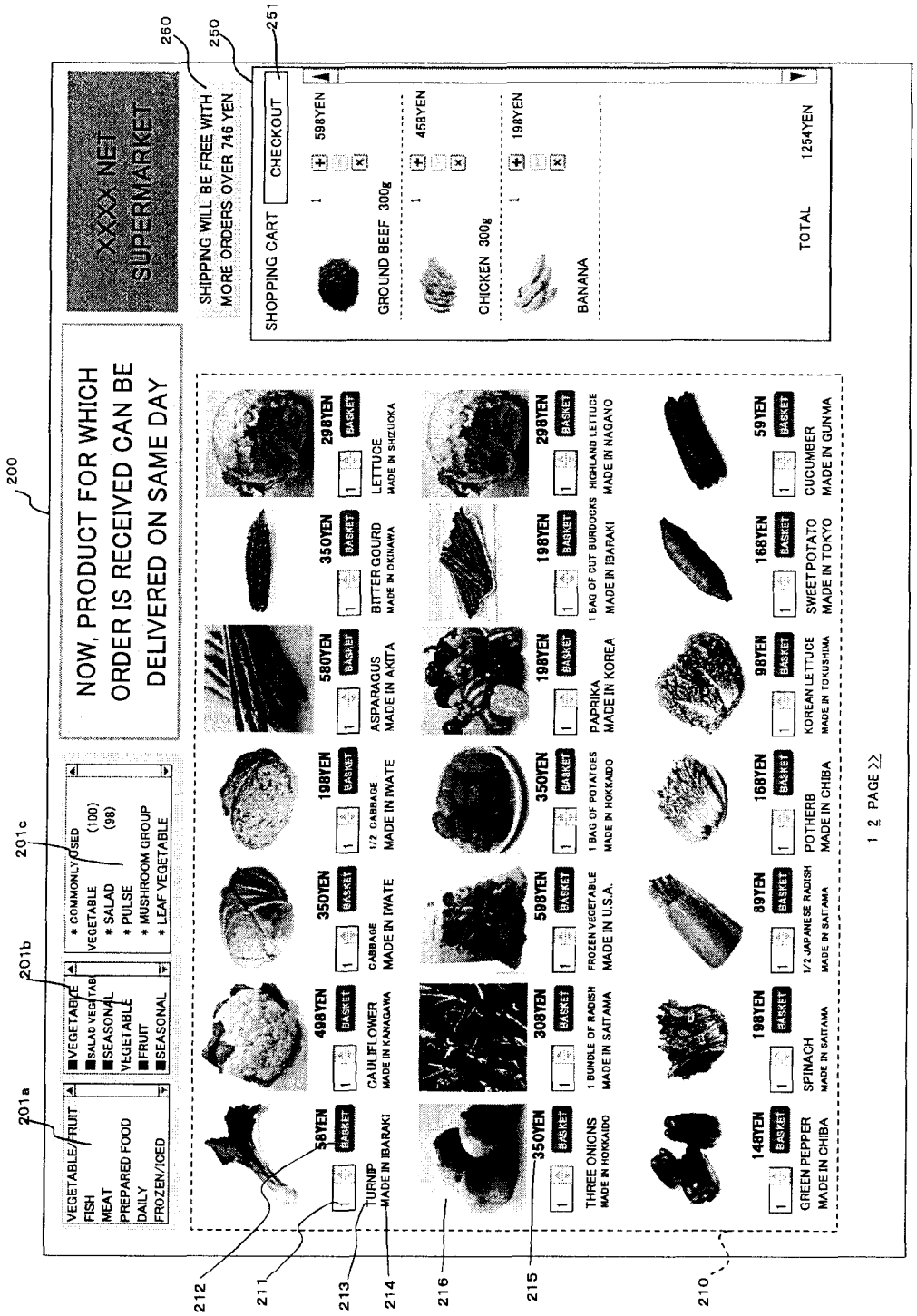
FIG. 5 illustrates a screen example of a product list screen according to the present embodiment.

As illustrated in FIG. 5, in a selectable product display area 210 of the product list screen 200, products which the user can select, that is, products which can be registered in the shipping cart 250 are displayed. Further, in the selectable product display area 210, order quantity selection box 211 used to select the order quantity of products, a shopping cart button 212 used to place a product in the shopping cart, a product name 213, production place 214 of a product, a price (corresponding to sales price of the stock DB 123) 215 of a product and a product image 216 are displayed per product. A product for which the shopping cart button 212 is pushed (clicked) is registered in the shopping cart 250 according to the order quantity displayed in the order quantity selection box 211. Further, in the shopping cart 250, a checkout button 251 is provided which is used to check out for products registered in the shopping cart 250, and, when the check out button 251 is pushed (clicked), a screen transitions to a checkout screen (not illustrated). In addition, information related to a product to be displayed on the product list screen 200 such as the product name 213, production place 214 of a product, price 215 of a product and product image 216 is an example of "product information" of the present invention.

Further, above the selectable product display area 210, a large genre selection area 201a, middle genre selection area 201b and a small genre selection area 201c used to narrow down products to display on the selectable product display area 210 are provided. The user can narrow down products which need to be specified as display targets by selecting a genre to which products which need to be displayed in the selectable product display area 210 belong, in order of the large genre, middle genre and small genre.

On the right side of the selectable product display area 210 in FIG. 5, the shopping cart 250 is displayed. In the shopping cart 250, selected product related information (information showing the name, order quantity and sales price of the selected product and the total amount of sales prices of the selected products) which is information related to a product corresponding to the shopping cart button 212 the user pushed (clicked) is displayed.

Thus, FIG. 5 illustrates the product list screen 200 in a state before the free shipping conditions are met, and, before the free shipping conditions are met, selected product related information (information showing the names, order quantities and sales prices of selected products and the total amount of the sales prices of the selected products) which is content of the shopping cart 250 can be checked. By contrast with this, as illustrated in FIG. 6, the product list screen 200 in a state after the free shipping conditions are met displays the folded shopping cart 250, and therefore selected product related information which is content of the shopping cart 250 cannot be checked.

Figure 6:
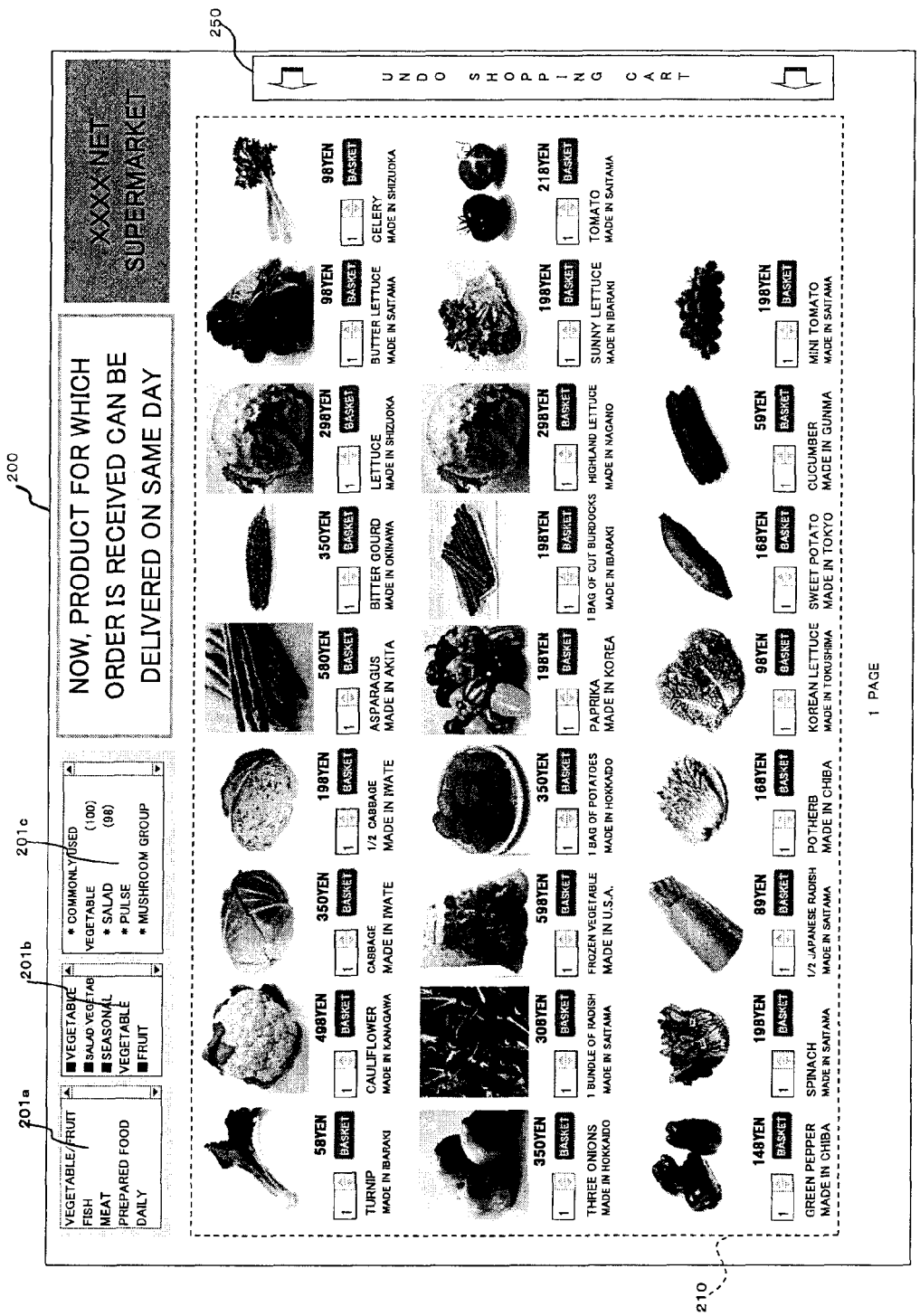
FIG. 6 illustrates a screen example of a product list screen according to the present embodiment.

As illustrated in FIG. 6, while the folded shopping cart 250 does not display content of the shopping cart, that is, information related to selected products (information showing names, order quantities and sales prices of selected products and the total amount of sales prices of the selected products), the selectable product display area 210 expands, and the number of products to be displayed in the selectable product display area 210 increases. Further, when the user wants to check content of the shopping cart 250, by performing an operation (an example of a "display operation") of selecting (specifying an area using a pointer or clicking an area) one of areas of the shopping cart 250 in FIG. 6, the shopping cart 250 in a state before the free shipping conditions are met is displayed as illustrated in FIG. 5 and selected product related information which is content of the shopping cart 250 can be checked.

Further, as illustrated in FIG. 5, above the shopping cart 250 of the product list screen 200 in a state before the free shipping conditions are met, a condition display area 260 is provided and displays information related to the free shipping conditions. More specifically, a price obtained by subtracting from 2000 yen the total amount (1254 yen with the example of FIG. 5) of sales prices of products registered in the shopping cart is displayed as the amount of money required to reach 2000 yen. Further, although the condition display area 260 is displayed until the free shipping conditions are met, the condition display area 260 are not displayed after the free shipping conditions are met (see FIG. 6). In addition, the condition display area 260 may display a message that "shipping will be free if products for 2000 yen are selected (purchased)" as information related to the free shipping conditions instead of displaying the amount of money required to reach 2000 yen. In addition, the product list screen 200 is controlled by the system control unit 14 based on product list screen Web page data. That is, the product list screen Web page data is an example of "command data" which makes the system control unit 14 function as a "display control means" and a "selection operation detecting means".

[4. Operation of Order Receiving System S]

Next, an operation of the order receiving system S according to one embodiment of the present invention will be described.

Figure 7:
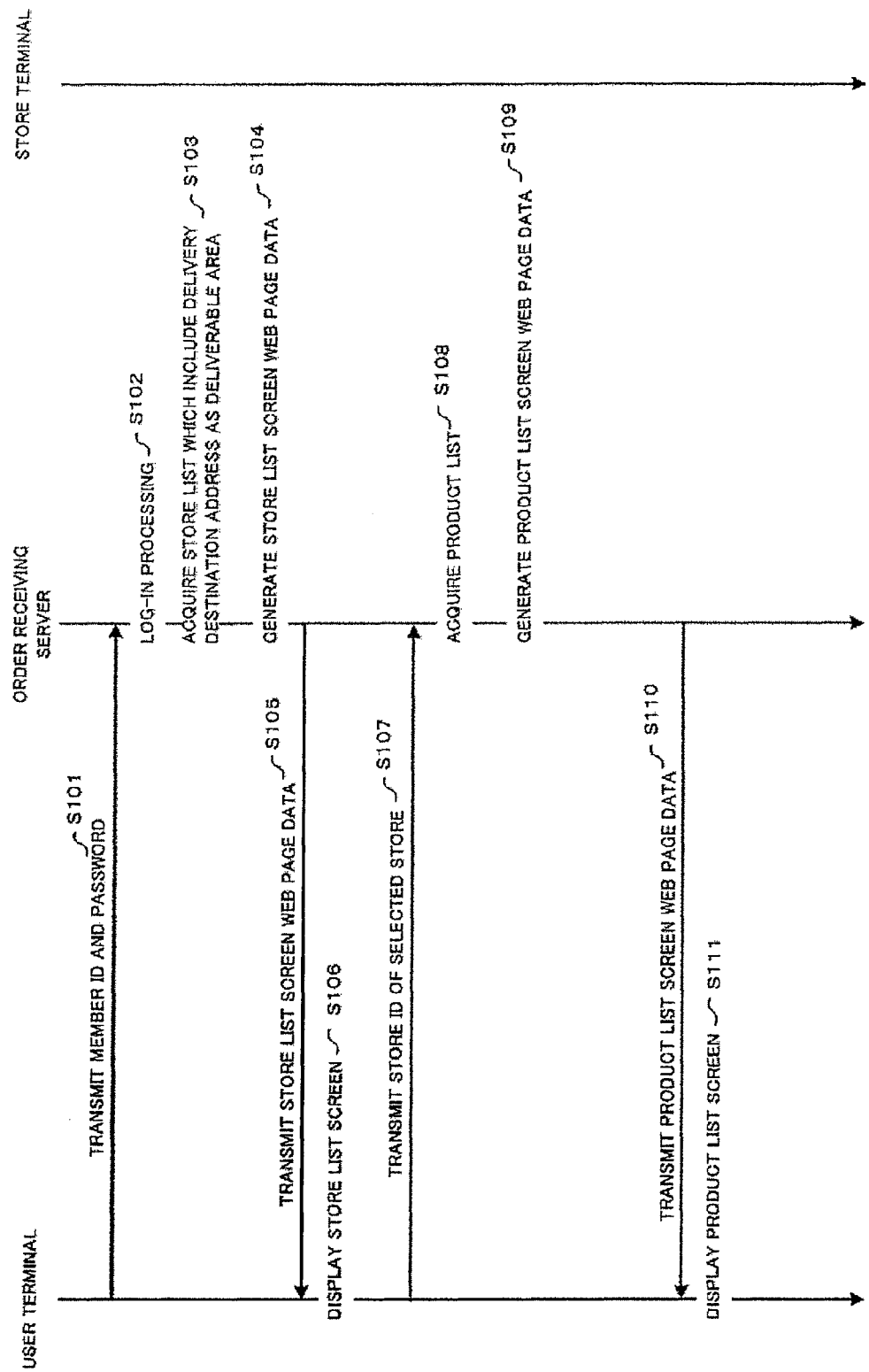
FIG. 7 is a sequence diagram illustrating an operation example of an order receiving system according to the present embodiment.

An operation of providing information related to a product covered by the net supermarket from the order receiving server 1 to the user terminal 2, receiving the order of the product specified by the user terminal 2 based on this information and transmitting the order content to the store terminal 3 will be described using sequence diagrams illustrates in FIGS. 7 and 9 and the flowchart illustrated in FIG. 8. In addition, before processings illustrated in these sequence diagrams start, the user terminal 2 accesses a net supermarket site, and makes the display unit 32 display a top page (not illustrated) of a net supermarket site.

First, when detecting an operation of transmitting a member ID and password to the order receiving server 1, the system control unit 36 of the user terminal 2 transmits the input member ID and password to the order receiving server 1 (step S101).

When receiving the member ID and password, the system control unit 14 of the order receiving server 1 performs log-in processing (step S102). More specifically, the system control unit 14 searches in the member DB 121 based on the received member ID, checks whether or not a corresponding member ID is registered, and, when the member ID is registered, checks whether or not the received password and the authentication password registered in the member DB 121 match. Further, the system control unit 14 decides that no problem is found in log-in processing only when the corresponding member ID is registered in the member DB 121 and passwords match.

When deciding that a problem is found in the log-in processing, the system control unit 14 transmits error information indicating that an error has occurred in the log-in processing, to the user terminal 2, and makes the user terminal 2 display the error message on the display of the user terminal 2. When deciding that no problem is found in the log-in processing, the system control unit 14 refers to the member DB 121, acquires the registered delivery destination address, then refers to the store DB 122 and acquires a list of stores or branch stores which include the acquired delivery destination address as a deliverable area (step S103).

Next, the system control unit 14 generates Web page data (referred to as "store list screen Web page data") for displaying a store list screen (not illustrated) which displays the acquired delivery destination address and store list (step S104), and transmits Web page data to the user terminal 2 (step S105).

When receiving the store list screen Web page data, the system control unit 36 of the user terminal 2 makes the display unit 32 display the store list screen (step S106). When the store list screen is displayed, the user (member) (i) checks whether or not the displayed delivery destination address is an address to receive the ordered product and (ii) select an order recipient (purchasing) store. In addition, when there is an error in an address or when a product is received at an address different from the delivery destination address, a correct address to receive the product is transmitted as a new delivery destination address to receive the store list screen Web page again from the order receiving server 1. At this time, when receiving the new delivery destination address, the system control unit 14 of the order receiving server 1 acquires again a list of stores including the new delivery destination address as a deliverable area, generates store list screen Web page for displaying the new delivery destination address and the acquires store list, and transmits the store list screen Web page to the user terminal 2.

When the user selects the order recipient store, the system control unit 36 of the user terminal 2 transmits the store ID of the selected store to the order receiving server 1 (step S107).

When receiving the store ID, the system control unit 14 of the order receiving server 1 refers to the stock DB 123, and acquires a product list of products covered by a store matching the received store ID (step S108). Further, the system control unit 14 refers to the product DB 124 and image DB 125, and acquires product information such as information or image data showing genre IDs, product names, sales prices, standards and production places of products included in the acquired product list.

Next, the system control unit 14 generates product list screen Web page data for displaying product information related to a product included in the acquired product list (step S109), and transmits the product list screen Web page data to the user terminal 2 (step S110).

When receiving the product list screen Web page data, the system control unit 36 of the user terminal 2 makes the display unit 32 display the product list screen 200 (step S111). When the product list screen 200 is displayed, the user (member) can register a product in the shopping cart 250 by selecting in the order quantity selection box 211 the order quantity of a product displayed in the selectable product display area 210, and pushing (clicking) the shopping cart button 212. Further, after all products to order are registered in the shopping cart 250, checkout processing can be performed by pushing (clicking) the checkout button 251.

Meanwhile, processing when the system control unit 36 of the user terminal 2 makes the display unit 32 display the product list screen 200 will be described using FIG. 8.

First, the system control unit 36 decides whether or not the shopping cart button 212 is pushed (clicked) (step S501). At this time, when deciding that the shopping cart button 212 is not pushed (clicked) (step S501: NO), the system control unit 36 transitions to processing in step S505. By contrast with this, when deciding that the shopping cart button 212 is pushed (clicked) (step S501: YES), the system control unit 36 registers a product corresponding to the pushed (clicked) shopping cart button 212, in the shopping cart 250 (step S502).

Next, the system control unit 36 decides whether or not the free shipping conditions are met (step S503). More specifically, the system control unit 36 decides whether or not the total amount of sales prices of the products registered in the shopping cart 250 reaches the free shipping money amount (2000 yen). At this time, when deciding that the free shipping conditions are not met (step S503: NO), the system control unit 36 transitions to processing in step S505. By contrast with this, when deciding that the free shipping conditions are met (step S503: YES), the system control unit 36 displays the folded shopping cart 250 so as not to display content of the shopping cart 250 (step S504).

Next, the system control unit 36 decides whether or not the checkout button 251 is pushed (clicked) (step S505). At this time, when deciding that the checkout button 251 is not pushed (clicked) (step S505: NO), the system control unit 36 transitions to processing in step S501. By contrast with this, when deciding that the checkout button 251 is pushed (clicked) (step S505: YES), the system control unit 36 generates order data indicating the all products and order quantities registered in the shopping cart 250 (step S506), and finishes processing in this flowchart.

Figure 9:
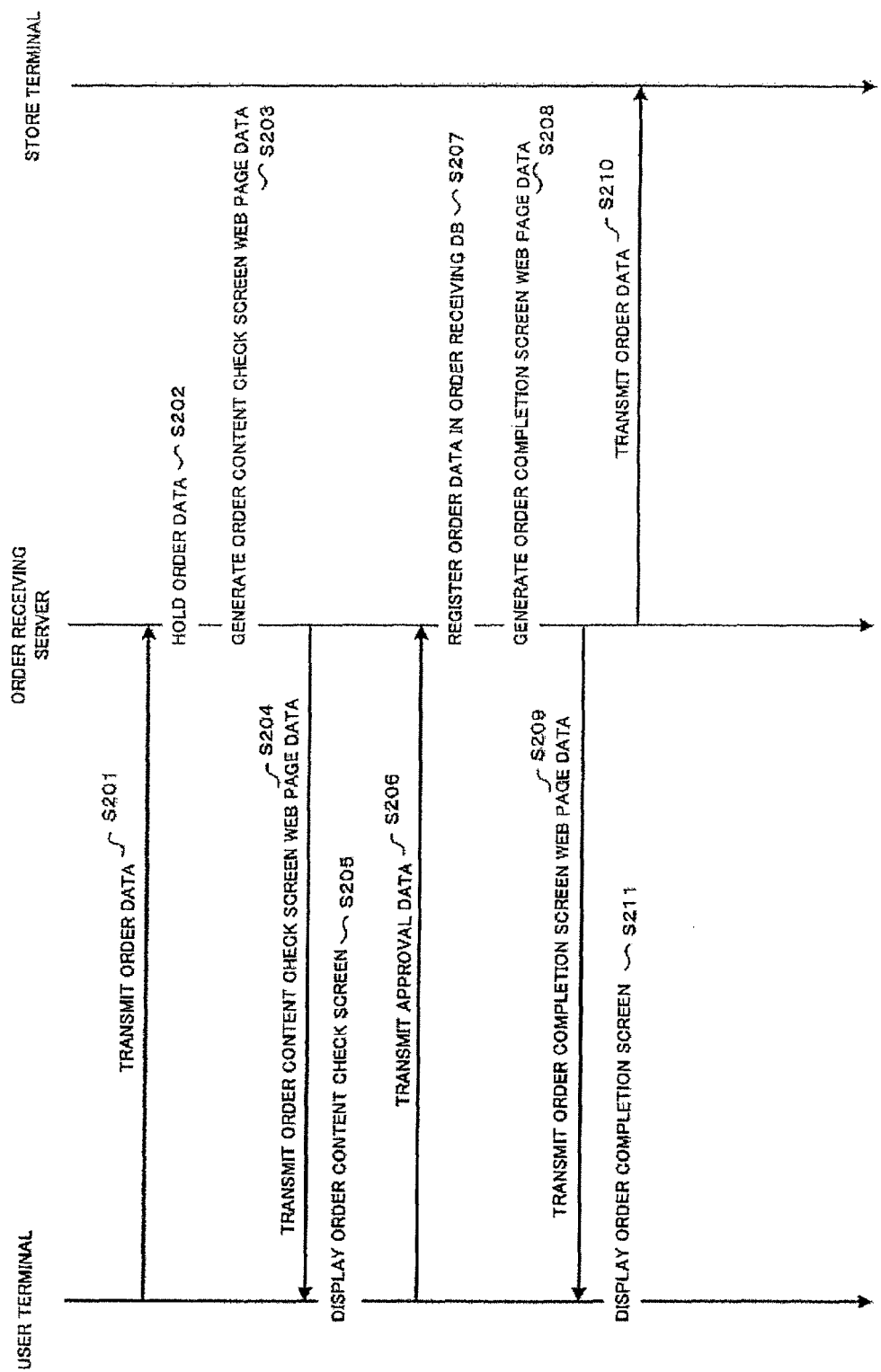
FIG. 9 is a sequence diagram illustrating an operation example of an order receiving system according to the present embodiment.

When generating order data, the system control unit 36 transmits the order data to the order receiving server 1 as illustrated in FIG. 9 (step S201).

When receiving the order data, the system control unit 14 of the order receiving server 1 holds the order data in the storage unit 12 (step S202), and generates order content check screen Web page data for displaying an order content check screen (not illustrated) for making the user check whether or not there is not an error in order content, based on the order data (step S203). Next, the system control unit 14 transmits the order content check screen Web page data, to the user terminal 2 (step S204).

When receiving order content check screen Web page data, the system control unit 36 of the user terminal 2 makes the display unit 32 display the order content check screen (step S205). The order content check screen allows the user to check the order content (ordered products and quantities) on the product list screen 200, and the user checks the order content on the order content check screen and pushes (clicks) an approval button if there is no error. When detecting an operation of pushing (clicking) the approval button, the system control unit 36 transmits approval data indicating that the user approved the order content, to the order receiving server 1 (step S206).

When receiving approval data, the system control unit 14 of the order receiving server 1 registers the order data held in processing in step S202, in the order receiving DB (not illustrated) (step S207). Next, the system control unit 14 generates order completion screen Web page data for displaying an order completion screen (not illustrated) indicating that order reception is completed (step S208), and transmits the order completion screen Web page data to the user terminal 2 (step S209). Further, the system control unit 14 transmits order data registered in the order receiving DB, to the store terminal 3 (step S210).

When receiving order completion screen Web page data, the system control unit 36 of the user terminal 2 makes the display unit 32 display the order completion screen (step S211).

As described above, with the user terminal 2 according to the present embodiment, content of the shopping cart 250

(information related to products registered in the shopping cart 250, which is an example of "selected product related information") is displayed in the product list screen 200 until the free shipping conditions (an example of "trade terms and conditions") are met, and, after the free shipping conditions are met, is not displayed as long as an operation of selecting one area of the folded shopping cart 250 is detected (see FIG. 6).

Consequently, the user can check content of the shopping cart 250 until the free shipping conditions are met, and recognize that the free shipping conditions are met, based on that display of the shopping cart 250 is switched to display of the folded shopping cart 250 (see FIG. 6). Further, after the free shipping conditions are met, display of content of the shopping cart 250 does not prevent a great number of pieces of product information from being displayed, so that it is possible to improve the user's visibility.

In case where the total purchase money amount reaches a predetermined amount, for example, a net supermarket gives a service (so-called free shipping service) that the supermarket side takes a delivery fee of products, to a customer as a benefit when predetermined conditions regarding purchase of products are met. Hence, while there are many cases where the user selects a product while wondering what product and how many products the user has to purchase more caring content of the shopping cart, and, if the shopping cart is completely hidden to display many products in the product list screen, user's convenience decreases, the user can check content of the shopping cart 250 until the free shipping conditions are met with the present embodiment.

Further, the user terminal 2 displays the condition display area 260 until the free shipping conditions are met (see FIG. 5). That is, while the total amount of prices of products selected by the user reaches 2000 yen, the rest of prices to reach 2000 yen is displayed, so that the user can easily learn how many products the user needs to select more to reach 2000 yen.

Further, as content of the shopping cart 250 (an example of "selected product related information"), the names and sales prices of products selected by an operation (an example of "selection operation") of pushing (clicking) the shopping cart button 212 and the total amount of prices of the selected products are displayed. Consequently, the user can easily recognize the names and sales prices of products selected by the user, and total amount of prices of the selected products.

Further, while the user who selects many products in the net supermarket which covers several tens of thousands of products feels inconvenience if the shopping cart 250 is displayed at all times, the user terminal 2 does not display the shopping cart 250 after the free shipping conditions are met, so that the user does not feel inconvenience.

Particularly, with the net supermarket site, products which are generally covered include many types and many items ranging from fresh food to daily goods, and every one of covered products costs is small in value. Hence, upon shopping at the net supermarket, there are comparatively many cases where a plurality of products are purchased instead of one product to reach a purchase amount for free shipping. Hence, it is very inconvenient for the user to care about the total amount in the current shopping cart before the total amount reaches the free shipping money amount and, at the same time, check the shopping cart by an additional operation every time the user places one product in the cart. Consequently, the current purchase amount is preferably displayed at a position which can be easily checked until the total amount reaches the free shipping money amount.

By contrast with this, products of many types and many items are covered by the net supermarket site, and therefore there is a demand that a product display screen is effectively used as much as possible. That is, there are a problem that the display area per product in the product selection screen becomes small and the user has difficulty in seeing the product or a problem that the product selection screen becomes large (for example, vertically long) and the user needs to scroll the screen to select a product. Hence, if the shopping cart continues to be displayed at an upper end or right end on the product selection screen, there are cases where this prevents many products from being displayed.

Thus, while the net supermarket site faces the above contradicting demands because of its nature, the user terminal 2 according to the present embodiment can meet these contradicting demands by displaying the shopping cart 250 until the total amount reaches the free shipping money amount as illustrated in FIG. 5, while not displaying content of the shopping cart 250 after the total amount reaches the free shipping amount as illustrated in FIG. 6.

In addition, although, with the present embodiment, the free shipping conditions include that the total amount of sales prices of products registered in the shopping cart 250 reaches a predetermined amount of 2000 yen, instead of this, the free shipping conditions may include that the number of products registered in the shopping cart 250 reaches a predetermined number (for example, 10 items which is an example of a "free shipping number"). In this case, while the number of products selected by the user reaches a predetermined number, the user can select products while checking content of the shopping cart 250.

Further, with the present embodiment, after the free shipping conditions are met, display of the shopping cart 250 may be switched to display of the folded shopping cart 250 (see FIG. 6). In this regard, as illustrated in, for example, FIG. 10, after the free shipping conditions are met, the shopping cart 250 may be moved in the product list screen 200 to an area (second display area) of a shopping cart 250A in FIG. 10 below an area (first display area) of the shopping cart 250 in FIG. 5. Even in this case, after the free shipping conditions are met, the user can continuously select products without caring content of the shopping cart 250. Further, it is possible to expand the selectable product display area 210 to an area which displayed the shopping cart 250. In addition, when the selectable product display area 210 is expanded, display of each product information may be enlarged leaving the number of products to display as is. Further, the up and down directions described herein refer to up and down directions which are naturally assumed from display of products and alignment of texts on the product list screen 200 displayed on the display unit of the user terminal 2.

Figure 10:
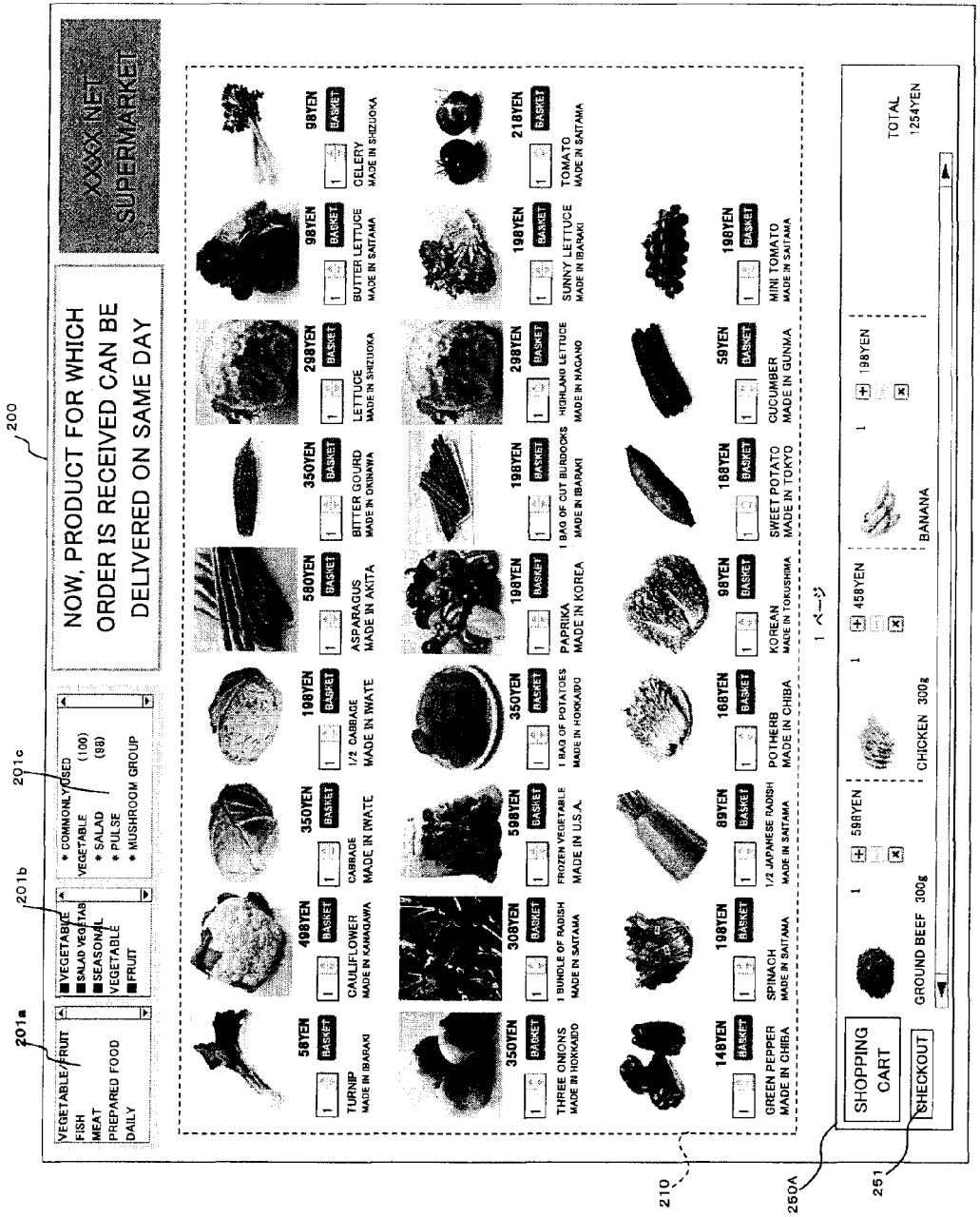
FIG. 10 illustrates a screen example of a product list screen according to a modified example of the present embodiment.

As illustrated in FIG. 10, the second display area may be below the selectable product display area 210 in the product list screen 200.

In addition, in case of FIG. 5, although the first display area has a portion which overlaps the selectable product display area 210 in the up and down directions in the product list screen 200, the first display area may be positioned above the selectable product display area 210 in the product list screen 200.

Further, when, for example, the product list screen is configured to be vertically long such that the entire area of the screen cannot be displayed if the screen is vertically scrolled, the shopping cart 250 which is not folded may be provided in the upper portion of the product list screen until the free shipping conditions are met and, after the free shipping conditions are met, the shopping cart 250 which is not folded may be moved to the lowermost portion of the product list screen which cannot be displayed in the screen if a downward scroll operation (an example of the "display operation") is not performed. In this case, after the free shipping conditions are met, the user can continuously select products without caring content of the shopping cart 250. Further, it is possible to expand the selectable product display area 210 to an area which displayed the shopping cart 250. In addition, when the selectable product display area 210 is expanded, display of each product information may be enlarged leaving the number of products to display as is.

Figure 8:
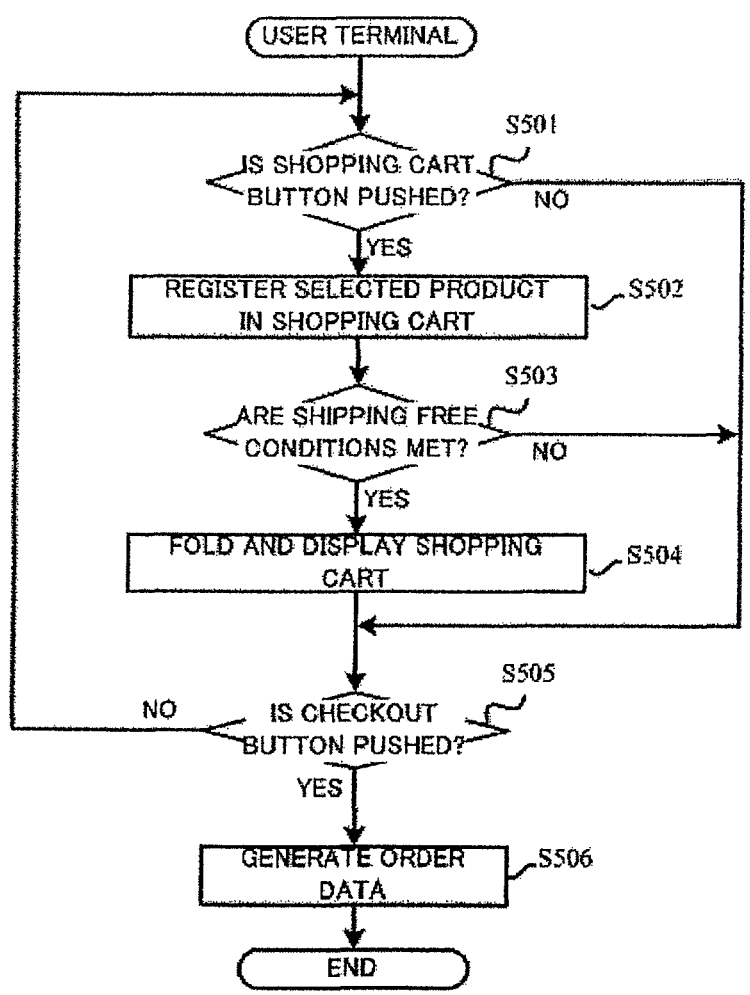
FIG. 8 is a flowchart illustrating an operation example upon display of a product list screen of the user terminal according to the present embodiment.

Further, although it has been described above as if processings in step S501 to step S506 illustrated in FIG. 8 were performed only in the system control unit 36 of the user terminal 2, the system control unit 36 of the user terminal 2 and the system control unit 14 of the order receiving server 1 may perform these processings in collaboration while exchanging data. More specifically, the user terminal 2 transmits product IDs and order quantities of the selected products to the order receiving server 1 every time the shopping cart button 212 is pushed (clicked). The order receiving server 1 generates display data for updating display of the shopping cart 250 in the system control unit 14 (which functions as a "display data generating means") based on the product IDs and order quantities (an example of "selected product identification information") received by the communication unit 11 (which functions as a "selected product identification information receiving means"). Then, the communication unit 11 (which functions as the "transmitting means") of the order receiving sever 1 returns the generated display data to the user terminal 2. However, the order receiving server 1 receives product IDs a plurality of times as selected product identification information, and, when deciding in the system control unit 14 that the total of sales prices of the selected products reaches 2000 yen, returns from the communication unit 11 display data for displaying the folded shopping cart 250 or display data for moving the shopping cart 250 to the second display area and displaying the shopping cart 250. Further, when the checkout button 251 is pushed (clicked), the user terminal 2 transmits to the order receiving server 1 data indicating that the checkout button 251 is pushed (clicked), and, when receiving this data, the order receiving server 1 generates order content check screen Web page data based on the product IDs and order quantities received so far. In addition, these processings correspond to the processings in step S501 to step S506 illustrated in FIG. 8, and the processings in step S201 to step S203 illustrated in FIG. 9.

Furthermore, with the present embodiment, although the shopping cart 250 is displayed in the product list screen 200, the shopping cart 250 may be displayed in another screen (another window). In this case, in a state before the free shipping conditions are met, another screen which displays the shopping cart 250 is displayed at all times in one area of the display area of the display unit 32 and, in a state after the free shipping conditions are met, another screen is closed and is displayed again only when a predetermined operation (for example, an operation of clicking a shopping cart display button provided in the product list screen 200) is detected.

Further, although, with the above embodiment, an access to the net supermarket site is made and, immediately after the top page (not illustrated) of the net supermarket site is displayed, log-in processing is performed, the timing to perform log-in processing is by no means limited to this. For example, log-in processing may be performed when order data indicating all products and order quantities registered in the shopping cart 250 is transmitted to the order receiving server 1. In this case, using Cookie information generated when the user accessed the order receiving server 1 from the terminal device in the past and stored in the terminal device, when the user subsequently accesses the net supermarket site from the terminal device, a list of stores or branch stores may be acquired which includes the delivery destination address of the user as a deliverable area.

The present invention is by no means limited to the above embodiment. The above embodiment is only an example, and the technical scope of the present invention incorporate all apparatuses which have substantially the same configuration as the technical idea disclosed in the claims of the present invention and which provide the same functions and effects.

EXPLANATION OF REFERENCE NUMERALS

1 ORDER RECEIVING SERVER
2 USER TERMINAL
31 USER TERMINAL/OPERATION UNIT
32 USER TERMINAL/DISPLAY UNIT
33 USER TERMINAL/COMMUNICATION UNIT
34 USER TERMINAL/STORAGE UNIT
35 USER TERMINAL/INPUT/OUTPUT INTERFACE UNIT
36 USER TERMINAL/SYSTEM CONTROL UNIT
37 USER TERMINAL/SYSTEM BUS
3 STORE TERMINAL
NW NETWORK
S ORDER RECEIVING SYSTEM

The invention claimed is:

1. A server apparatus that provides an e-commerce site related to a trade of a product, to a terminal device connected through a network, the server apparatus comprising:
   at least one non-transitory memory operable to store program code; and
   at least one processor operable to read said program code and operate as instructed by said program code, said program code comprising:
   display data generating code configured to cause at least one of said at least one processor to generate display data for making a display device of the terminal device display a trade screen that displays product information on a plurality of products;
   transmitting code configured to cause at least one of said at least one processor to transmit the display data generated by the display data generating code, to the terminal device; and
   selected product identification information receiving code configured to cause at least one of said at least one processor to receive, from the terminal device, selected product identification information for identifying a product selected by a selection operation as a product to trade, among the plurality of products displayed in the trade screen, wherein:
   the display data generating code is further configured to cause at least one of said at least one processor to identify the selected product based on the selected product identification information received by the selected product identification information receiving code, acquire selected product information about the identified product based on the selected product identification information, and generate the trade screen arranged to:

display, at least one piece of information on each product in a first set of products, among the plurality of products, in one of a plurality of locations in a product selectable region in the trade screen, each location in the product selectable region corresponding to the first set of products that are selectable by a user;

display at least one piece of information on the product, selected by the selection operation by the user from the first set of products in the product selectable region, in one of a plurality of locations in a shopping cart region of the trade screen;

in response to determining that the selected product information meet predetermined trade terms and conditions, dynamically minimize the shopping cart region to display a minimized shopping cart region which is smaller than the shopping cart region, and dynamically display an expanded product selectable region, which includes the product selectable region and an additional product selectable region corresponding to at least a portion of a region included in the shopping cart region prior to the minimizing of the shopping cart region and display, at least one piece of information on each product in a second set of products, among the plurality of products, in one of a plurality of locations in the additional product selectable region in the trade screen, each location in the additional product selectable region corresponding to the second set of products that are selectable by the user.

2. The server apparatus according to claim 1, wherein the display control is a control to move the selected product information to a lower portion of the trade screen.

3. The server apparatus according to claim 1, wherein the trade terms and conditions are met when a total amount of prices of products selected according to the selection operation reaches a free shipping money amount determined in advance as an amount of money for providing free shipping of products.

4. The server apparatus according to claim 3, wherein the display data generating code is configured to cause at least one of said at least one processor to make the trade screen display a difference between a total amount of prices of products selected according to the selection operation and the free shipping money amount when the trade terms and conditions are not met, and generates the display data for not making the trade screen display the difference when the trade terms and conditions are met.

5. The server apparatus according to claim 1, wherein the trade terms and conditions are met when a number of products selected according to the selection operation reaches a free shipping number determined in advance as a number that provides free shipping of products.

6. The server apparatus according to claim 1, wherein the selected product information indicates at least one of a name and a price of a product selected according to the selection operation and a total amount of prices of products selected according to the selection operation.

7. The server apparatus according to claim 1, wherein the e-commerce site is a net supermarket site.

8. The server apparatus according to claim 1, wherein the display data generating code is further configured to cause at least one of said at least one processor to enable the selected product information to be displayed by detecting a display operation for displaying the selected product information when the trade terms and conditions are met, and generate the display data for not making the trade screen display the selected product information.

9. The server apparatus according to claim 1, wherein the display data is data for displaying a Web page corresponding to the trade screen,
the entire area of the Web page cannot be displayed in a screen of the display device if the Web page is not scrolled, and
the display control is a control to move the selected product information to a portion of the Web page which cannot be displayed in the screen if a scroll operation is not performed to expand the product selectable region.

10. The server apparatus according to claim 9, wherein the Web page is configured to be vertically long, and
the display control is a control to move the selected product information to the bottom of the Web page to expand the product selectable region.

11. The server apparatus according to claim 1, wherein the display control is a control not to display the selected product information to expand the product selectable region when the selected product information meet predetermined trade terms and conditions.

12. The server apparatus according to claim 1, wherein the display data generating code is further configured to cause at least one of said at least one processor to display, the at least one piece of information on each product in the second set of products, among the plurality of products, in one of the plurality of locations in the additional product selectable region in the trade screen, while displaying the at least one piece of information on each product in a first set of products, among the plurality of products, in one of the plurality of locations in a product selectable region in the trade screen.

13. The server apparatus according to claim 1, wherein the display data generating code is further configured to cause at least one of said at least one processor to display, the at least one piece of information on each product in the second set of products, among the plurality of products, in one of the plurality of locations in the additional product selectable region in the trade screen for effectively utilizing the expanded product selectable region when the selected product information meet predetermined trade terms and conditions.

14. The server apparatus according to claim 1, wherein screen switching control for switching the trade screen to display the minimized shopping cart region with the additional product selectable region including the at least one piece of information on each of the product in the second set of products is performed by the terminal device.

15. A server apparatus that provides an e-commerce site related to a trade of a product, to a terminal device connected through a network, wherein:
the server apparatus transmits command data to the terminal device, the terminal device comprising:
at least one non-transitory memory operable to store program code; and
at least one processor operable to read said program code and operate as instructed by said program code, said program code comprising:
display control code configured to cause at least one of said at least one processor to make a display device display a trade screen that displays product information received from the server apparatus for a plurality of products; and selection operation detecting code configured to cause at least one of said at least one processor to detect a selection operation of selecting a product, among the plurality of products displayed in the trade screen;

wherein the display control code is further configured to cause at least one of said at least one processor to and generate the trade screen arranged to:

display, at least one piece of information on each product in a first set of products, among the plurality of products, in one of a plurality of locations in a product selectable region in the trade screen, each location in the product selectable region corresponding to the first set of products that are selectable by a user;

display at least one piece of information on the product, selected by the selection operation by the user from the first set of products in the product selectable region, in one of a plurality of locations in a shopping cart region of the trade screen; and in response to determining that the selected product information meet predetermined trade terms and conditions, dynamically minimize the shopping cart region to display a minimized shopping cart region which is smaller than the shopping cart region, and dynamically display an expanded product selectable region, which includes the product selectable region and an additional product selectable region corresponding to at least a portion of a region included in the shopping cart region prior to the minimizing of the shopping cart region and display, at least one piece of information on each product in a second set of products, among the plurality of products, in one of a plurality of locations in the additional product selectable region in the trade screen, each location in the additional product selectable region corresponding to the second set of products that are selectable by the user.

16. The server apparatus according to claim 15, wherein the first display area is positioned above product information to be displayed in the trade screen.

17. The server apparatus according to claim 15, wherein the first display area comprises a portion that overlaps product information to be displayed in the trade screen, in up and down directions in the screen.

18. The server apparatus according to claim 15, wherein the second display area is positioned below product information to be displayed in the trade screen.

19. The server apparatus according to claim 15, wherein the trade terms and conditions are met when a total amount of prices of products selected according to the selection operation reaches a free shipping money amount determined in advance as an amount of money for providing free shipping of products.

20. The server apparatus according to claim 19, wherein the display control code is configured to cause at least one of said at least one processor to make the trade screen display a difference between a total amount of prices of products selected according to the selection operation and the free shipping money amount when the trade terms and conditions are not met, and does not make the trade screen display the difference when the trade terms and conditions are met.

21. The server apparatus according to claim 15, wherein the trade terms and conditions are met when a number of products selected according to the selection operation reaches a free shipping number determined in advance as a number that provides free shipping of products.

22. The server apparatus according to claim 15, wherein the selected product information indicates at least one of a name and a price of a product selected according to the selection operation and a total amount of prices of products selected according to the selection operation.

23. The server apparatus according to claim 15, wherein the e-commerce site is a net supermarket site.

24. The server apparatus according to claim 15, wherein the display control code is configured to cause at least one of said at least one processor to enable the selected product information to be displayed by detecting a display operation for displaying the selected product information when the trade terms and conditions are met, and does not make the trade screen display the selected product information.

25. A product information display method comprising: a step of, at a computer, connecting to a server apparatus that provides an e-commerce site related to a trade of a product, through a network, and receiving product information on a plurality of products;

a step of, at the computer, making a display device display a trade screen that displays the received product information of a plurality of products;

a step of, at the computer, detecting a selection operation of selecting a product, among the plurality of products displayed in the trade screen; and a step of, at the computer, performing a display control of the selected product information to generate the trade screen arranged to:

display, at least one piece of information on each product in a first set of products, among the plurality of products, in one of a plurality of first locations in a product selectable region in the trade screen, each location in the product selectable region corresponding to the first set of products that are selectable by a user;

display at least one piece of information on the product, selected by the selection operation by the user from the first set of products in the product selectable region, in one of a plurality of locations in a shopping cart region of the trade screen; and in response to determining that the selected product information meet predetermined trade terms and conditions, dynamically minimize the shopping cart region to display a minimized shopping cart region which is smaller than the shopping cart region, and dynamically display an expanded product selectable region, which includes the product selectable region and an additional product selectable region corresponding to at least a portion of a region included in the shopping cart region prior to the minimizing of the shopping cart region and display, at least one piece of information on each product in a second set of products, among the plurality of products, in one of a plurality of locations in the additional product selectable region in the trade screen, each location in the additional product selectable region corresponding to the second set of products that are selectable by the user.

26. An e-commerce system comprising: a server apparatus that provides an e-commerce site related to a trade of a product, and a terminal device that is connected with the server apparatus through a network, wherein:

the server apparatus comprises:

at least one non-transitory memory operable to store program code; and at least one processor operable to read said program code and operate as instructed by said program code, said program code comprising:

display data generating code configured to cause at least one of said at least one processor to generate display data for making a display device of the terminal device display a trade screen that displays product information on a plurality of products;

transmitting code configured to cause at least one of said at least one processor to transmit the display data generated by the display data generating code, to the terminal device; and selected product identification information receiving code configured to cause at least one of said at least one processor to receive, from the terminal device, selected product identification information for identifying a product selected by a selection operation as a product to trade, among the plurality of products displayed in the trade screen;

the terminal device comprises:

at least one non-transitory memory operable to store program code; and at least one processor operable to read said program code and operate as instructed by said program code, said program code comprising:

display data receiving code configured to cause at least one of said at least one processor to receive display data transmitted from the transmitting code; and display control code configured to cause at least one of said at least one processor to make a display device display the trade screen, based on the received display data;

the display data generating code of the server apparatus configured to cause at least one of said at least one processor to identify the selected product based on the selected product identification information received by the selected product identification information receiving code, acquire selected product information about the identified product based on the selected product identification information, and generate the trade screen arranged to:

display, at least one piece of information on each product in a first set of products, among the plurality of products, in one of a plurality of first locations in a product selectable region in the trade screen, each location in the product selectable region corresponding to the first set of products that are selectable by a user;

display at least one piece of information on the product, selected by the selection operation by the user from the first set of products in the product selectable region, in one of a plurality of locations in a shopping cart region of the trade screen; and in response to determining that the selected product information meet predetermined trade terms and conditions, dynamically minimize the shopping cart region to display a minimized shopping cart region which is smaller than the shopping cart region, and dynamically display an expanded product selectable region, which includes the product selectable region and an additional product selectable region corresponding to at least a portion of a region included in the shopping cart region prior to the minimizing of the shopping cart region and display, at least one piece of information on each product in a second set of products, among the plurality of products, in one of a plurality of locations in the additional product selectable region in the trade screen, each location in the additional product selectable region corresponding to the second set of products that are selectable by the user.

27. An e-commerce system comprising: a server apparatus that provides an e-commerce site related to a trade of a product, and a terminal device that is connected with the server apparatus through a network, wherein:

the server apparatus transmits command data to the terminal device, the terminal device comprising:

at least one non-transitory memory operable to store program code; and at least one processor operable to read said program code and operate as instructed by said program code, said program code comprising:

display control code configured to cause at least one of said at least one processor to make a display device display a trade screen that displays product information received from the server apparatus for a plurality of products; and selection operation detecting code configured to detect a selection operation of selecting a product, among the plurality of products display in the trade screen;

the display control code configured to cause at least one of said at least one processor to and generate the trade screen arranged to:

display, at least one piece of information on each product in a first set of products, among the plurality of products, in one of a plurality of first locations in a product selectable region in the trade screen, each location in the product selectable region corresponding to the first set of products that are selectable by a user;

display at least one piece of information on the product, selected by the selection operation by the user from the first set of products in the product selectable region, in one of a plurality of locations in a shopping cart region of the trade screen; and in response to determining that the selected product information meet predetermined trade terms and conditions, dynamically minimize the shopping cart region to display a minimized shopping cart region which is smaller than the shopping cart region, and dynamically display an expanded product selectable region, which includes the product selectable region and an additional product selectable region corresponding to at least a portion of a region included in the shopping cart region prior to the minimizing of the shopping cart region and display, at least one piece of in on each product in a second set of products, among the plurality of products, in one of a plurality of locations in the additional product selectable region in the trade screen, each location in the additional product selectable region corresponding to the second set of products that are selectable by the user.

28. A terminal device that is connected to a server apparatus that provides an e-commerce site related to a trade of a product, through a network, the terminal device comprising:

at least one non-transitory memory operable to store program code; and at least one processor operable to read said program code and operate as instructed by said program code, said program code comprising:

receiving code configured to cause at least one of said at least one processor to receive product information on a plurality of products, from the server apparatus;

display control code configured to cause at least one of said at least one processor to make a display device display a trade screen that displays the received product information of the plurality of products; and selection operation detecting code configured to cause at least one of said at least one processor to detect a selection operation of selecting a product, among the plurality of products display in the trade screen, wherein:

the display control code is further configured to cause at least one of said at least one processor to and generate the trade screen arranged to:

display, at least one piece of information on each product in a first set of products, among the plurality of products, in one of a plurality of first locations in a product selectable region in the trade screen, each location in the product selectable region corresponding to the first set of products that are selectable by a user;

display at least one piece of information on the product, selected by the selection operation by the user from the first set of products in the product selectable region, in one of a plurality of locations in a shopping cart region of the trade screen; and in response to determining that the selected product information meet predetermined trade terms and conditions, dynamically minimize the shopping cart region to display a minimized shopping cart region which is smaller than the shopping cart region, and dynamically display an expanded product selectable region, which includes the product selectable region and an additional product selectable region corresponding to at least a portion of a region included in the shopping cart region prior to the minimizing of the shopping cart region and display, at least one piece of information on each product in a second set of products, among the plurality of products, in one of a plurality of locations in the additional product selectable region in the trade screen, each location in the additional product selectable region corresponding to the second set of products that are selectable by the user.

29. A non-transitory recording medium on which product information display program code is recorded, said program code configured to be executed by a processor, comprising:

code that receives product information on a plurality of products;

display control code that makes a display device display a trade screen that displays the received product information of the plurality of products; and selection operation detecting code that detects a selection operation of selecting a product, among the plurality of products display in the trade screen, wherein:

the display control code that generates the trade screen arranged to:

display, at least one piece of information on each product in a first set of products, among the plurality of products, in one of a plurality of first locations in a product selectable region in the trade screen, each location in the product selectable region corresponding to the first set of products that are selectable by a user;

display at least one piece of information on the product, selected by the selection operation by the user from the first set of products in the product selectable region, in one of a plurality of locations in a shopping cart region of the trade screen; and in response to determining that the selected product information meet predetermined trade terms and conditions, dynamically minimize the shopping cart region to dynamically display an expanded product selectable region, which includes the product selectable region and an additional product selectable region corresponding to at least a portion of a region included in the shopping cart region prior to the minimizing of the shopping cart region and display, at least one piece of information on each product in a second set of products, among the plurality of products, in one of a plurality of locations in the additional product selectable region in the trade screen, each location in the additional product selectable region corresponding to the second set of products that are selectable by a user.

\* \* \* \* \*